US012095828B2

(12) United States Patent
Winton et al.

(10) Patent No.: US 12,095,828 B2
(45) Date of Patent: Sep. 17, 2024

(54) IN-VEHICLE COMMUNICATIONS AND MEDIA MIXING

(71) Applicant: HARMAN INTERNATIONAL INDUSTRIES, INCORPORATED, Stamford, CT (US)

(72) Inventors: Riley Winton, Opelika, AL (US); Christopher Michael Trestain, Livonia, MI (US); Maxwell B. Willis, Detroit, MI (US); Carl Alexander Sandstrom, Struer (DK); Christopher Ludwig, Bloomfield Hills, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 71 days.

(21) Appl. No.: 17/565,838

(22) Filed: Dec. 30, 2021

(65) Prior Publication Data
US 2023/0216897 A1     Jul. 6, 2023

(51) Int. Cl.
| | |
|---|---|
| *H04M 1/72412* | (2021.01) |
| *H04L 65/1089* | (2022.01) |
| *H04L 65/403* | (2022.01) |
| *H04L 65/80* | (2022.01) |
| *H04M 1/60* | (2006.01) |

(52) U.S. Cl.
CPC ........ *H04L 65/1089* (2013.01); *H04L 65/403* (2013.01); *H04L 65/80* (2013.01); *H04M 1/6091* (2013.01); *H04M 1/72412* (2021.01)

(58) Field of Classification Search
CPC .............. H04L 65/1089; H04L 65/403; H04M 1/72412
See application file for complete search history.

(56) References Cited

U.S. PATENT DOCUMENTS

| | | | |
|---|---|---|---|
| 4,941,187 A | 7/1990 | Slater | |
| 6,813,777 B1 | 11/2004 | Weinberger et al. | |
| 9,578,440 B2 | 2/2017 | Otto et al. | |
| 9,898,250 B1 | 2/2018 | Williams et al. | |
| 10,440,493 B2 | 10/2019 | Trestain | |
| 11,146,887 B2 | 10/2021 | Winton et al. | |
| 2003/0063756 A1 | 4/2003 | Geerlings et al. | |
| 2009/0214010 A1* | 8/2009 | Langgood .............. | H04R 27/00 379/110.01 |
| 2009/0254839 A1* | 10/2009 | Kripalani ................ | G06F 3/167 709/204 |
| 2010/0115562 A1 | 5/2010 | Koike | |

(Continued)

FOREIGN PATENT DOCUMENTS

| | | |
|---|---|---|
| EP | 2 582 117 A1 | 4/2013 |
| KR | 20140059086 A | 5/2014 |

*Primary Examiner* — Amal S Zenati
(74) *Attorney, Agent, or Firm* — Artegis Law Group, LLP

(57) ABSTRACT

In various embodiments, a computer-implemented method comprises receiving a set of two or more first media signals from two or more consoles included in a vehicle, where each of the two or more consoles are included in a common communication session, combining the set of two or more first media signals to generate a composite media signal, transmitting, via a communication link, the composite media signal to a remote destination, receiving, via the communication link, a remote media signal from the remote destination, and causing the two or more first media signals and the remote media signal to be reproduced at the two or more consoles.

19 Claims, 12 Drawing Sheets

(56) References Cited

U.S. PATENT DOCUMENTS

| | | |
|---|---|---|
| 2010/0333004 A1 | 12/2010 | Kristiansen et al. |
| 2011/0161006 A1 | 6/2011 | Deurwaarder |
| 2012/0131619 A1 | 5/2012 | Ogilvie |
| 2014/0233716 A1 | 8/2014 | Villette et al. |
| 2018/0088777 A1* | 3/2018 | Dazé .................... G06F 3/0488 |
| 2018/0226077 A1 | 8/2018 | Choi et al. |
| 2018/0323504 A1 | 11/2018 | Louzir et al. |
| 2020/0005777 A1 | 1/2020 | Wittke |
| 2020/0103963 A1 | 4/2020 | Kelly et al. |
| 2020/0213560 A1* | 7/2020 | Zhang .................... H04N 7/147 |
| 2021/0204059 A1 | 7/2021 | Trestain et al. |
| 2021/0352335 A1 | 11/2021 | Watson et al. |
| 2022/0148592 A1 | 5/2022 | Maury et al. |
| 2022/0321951 A1 | 10/2022 | Chandrashekar et al. |

* cited by examiner

IN-VEHICLE COMMUNICATIONS AND MEDIA MIXING

BACKGROUND

Field of the Various Embodiments

The various embodiments relate generally to digital assistants and, more specifically, to in-vehicle communications and media mixing.

Description of the Related Art

Various vehicles include vehicle entertainment systems, such as in-car entertainment (ICE) or in-vehicle infotainment (IVI) systems, which include various hardware and software components that enhance the driver and passenger experience by providing audio or video entertainment, video gaming capability, Internet connectivity, and associated features to passengers and drivers. A given vehicle can include multiple devices, such as mounted units, rear-seat entertainment (RSE) units mounted on a vehicle seat, and/or portable devices that connect to the vehicle. Typically, each device is connected to a central hub, such as a head unit mounted near the driver seat and/or within the dashboard of the vehicle.

One drawback of conventional vehicle entertainment systems is that occupants operating the centralized head unit have difficulty managing the media that is output through the devices included in the vehicle. For example, when the centralized head unit controls the media on each device, other users, such as the multiple RSE device users, are required to request that the driver or another passenger proximate to the head unit control the head unit on behalf of the RSE device user in order to select or modify the media content that the RSE unit is presenting. In other examples, when each user separately controls their respective devices, a given occupant may have difficulty communicating with other occupants, as each occupant experiences different media and therefore may not notice that another occupant wants attention.

Another drawback of conventional vehicle entertainment systems is connecting a remote device requires a great amount of control and networking resources. For example, when multiple users are participants in a group telephone call, the vehicle entertainment system must separately transmit the media feed of each participant. However, providing separate feeds in this manner requires excessive amounts of processing and networking resources. Further, various techniques to enable group voice chat, such as muting the microphones of other participants, may make the conversation stilted within the vehicle, as the proximity of the occupants in the vehicle causes such audio blocking techniques to feel unnatural. Further, some head units support only one external connection at a time, limiting the ability of multiple users within the vehicle to participate in a given external call.

In light of the above, more effective techniques for controlling and mixing media content for in-vehicle devices would be useful.

SUMMARY

Various embodiments include a computer-implemented method comprising receiving a set of two or more first media signals from two or more consoles included in a vehicle, where each of the two or more consoles are included in a common communication session, combining the set of two or more first media signals to generate a composite media signal. transmitting, via a communication link, the composite media signal to a remote destination, receiving, via the communication link, a remote media signal from the remote destination, causing the two or more first media signals and the remote media signal to be reproduced at the two or more consoles.

Further embodiments provide, among other things, non-transitory computer-readable storage media storing instructions for implementing the method set forth above, as well as a system configured to implement the method set forth above.

At least one technological advantage of the media configuration manager relative to the prior art is that, with the disclosed techniques, the media configuration manager provides integrated control and mixing for multiple media consoles within a single vehicle or area. In particular, by controlling which media output is provided via multiple media consoles, the media configuration manager provides greater control over what media is delivered to occupants while inside a vehicle. Further, by processing and mixing media signals provided by multiple occupants in the vehicle, the media configuration manager provides a cleaner media signal to other participants in a communication session, such as remote participants that receive a single composite signal from the vehicle. These techniques also lower the bandwidth requirements imposed on a vehicle to enable multi-participant video sessions, as the vehicle does not need to have network capacity for multiple network connections. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Embodiments disclosed herein include a media configuration system that includes multiple media consoles that provide media and communications via instances of a companion media application. The media configuration system includes a media configuration manager that controls each instance of the companion media application operating on the respective consoles in order to control the playback of a specific media or the specific communications mode in use. In some modes, multiple devices share a common media (e.g., a shared playlist) or a common media signal (e.g., an intercom or a shared communications mode). In some modes, a given console included in the media configuration system can operate independently and use its companion media application in order to play back media based on a console-specific playlist controlled by a user of the console.

The media configuration system enables multiple consoles, including various subsets of the consoles up to and including each console in the vehicle to participate in various communications modes. In various embodiments, multiple consoles can be in a shared communications mode and join as participants in a shared communication session with a remote device. In such instances, the media configuration system receives multiple media signals (e.g., audio and/or video signals) from the participating consoles and mixes the signals into a composite media signal. The media configuration system causes the vehicle to transmit the composite media signal to the participating remote device; the media configuration system also receives a remote media signal from the participating remote device and distributes the remote media signal to the participating consoles. When supporting the shared communication session, the media configuration system can enable participants in the shared communication session to view the participants in various arrangements. The media configuration system can also determine, for one or more participants within or outside the vehicle, a specific position within the vehicle to represent the participant. The media configuration system can then cause one or more loudspeakers within the vehicle to spatially render the audio signal of the remote participant at the determined position.

System Overview

Figure 1A:
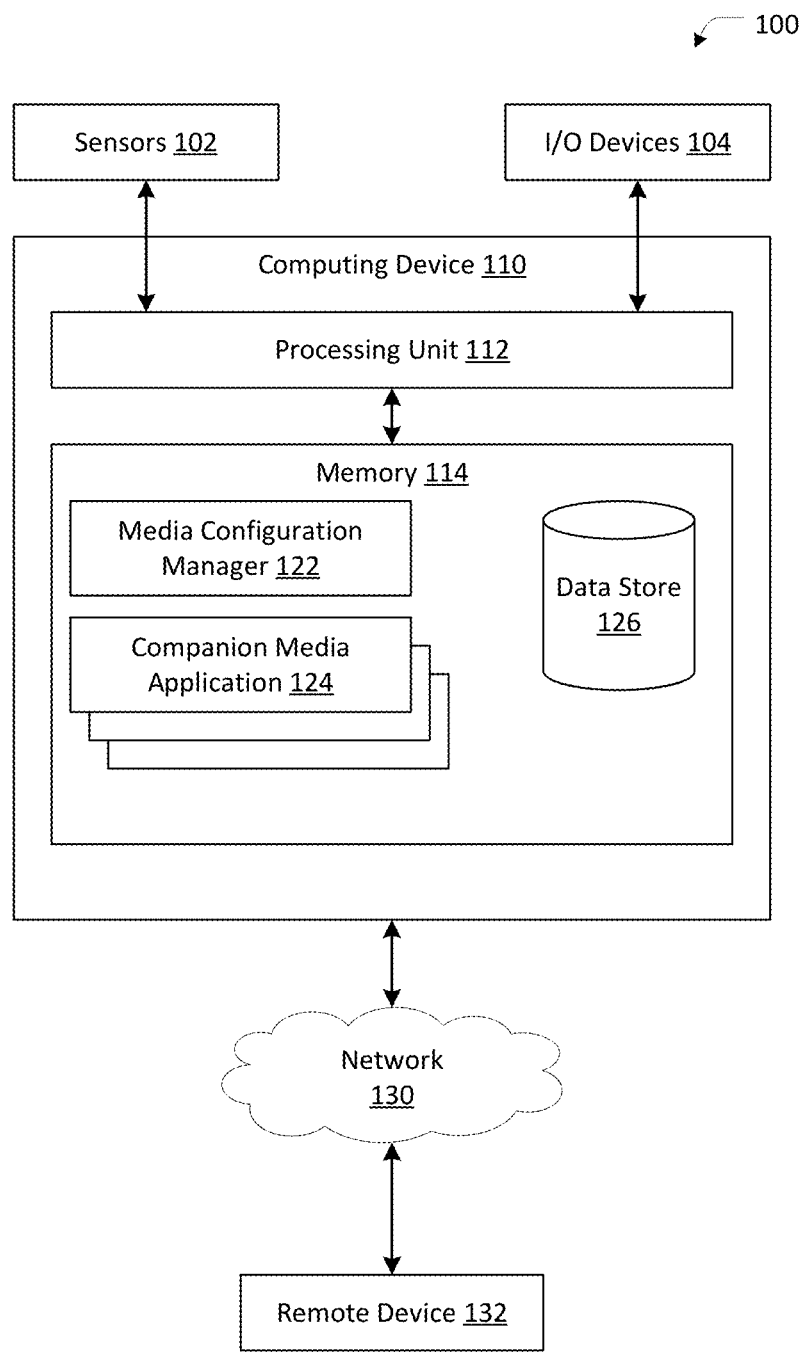
FIG. 1A illustrates a block diagram of the media configuration system configured to implement one or more aspects of the present disclosure.

FIG. 1A illustrates a block diagram of the media configuration system 100 configured to implement one or more aspects of the present disclosure. As shown, the media configuration system 100 includes, without limitation, a computing device 110, sensors 102, input/output (I/O) devices 104, a network 130, and remote devices 132. Computing device 110 includes a processing unit 112 and memory 114, where memory 114 stores, without limitation, a media configuration manager 122, a data store 126, and a companion media application 124.

In operation, the computing device 110 executes the media configuration manager 122 in order to control the operation of one or more instances of the companion media application 124 operating on various consoles (not shown) operating within a given vehicle. In particular, the processing unit 112 receives data from the sensors 102 and/or one or more I/O devices 104. The processing unit 112 executes the media configuration manager 122 to set a specific communications mode associated with the companion media application 124 operating on the computing device 110 and/or instances of the companion media application 124 operating on other consoles within the vehicle. For example, when the media configuration manager 122 sets the communications mode to a shared communications mode, the media configuration manager 122 can control the media playback (e.g., the output of loudspeakers and/or display devices provided by the respective consoles) provided via the companion media application 124. In another example, when the media configuration manager 122 sets the communications mode to an individual communications mode (e.g., "seat mode"), each instance of the companion media application 124 can operate independently from the other devices. In such instances, the companion media application 124 can control the media playback in lieu of responding to commands provided by the media configuration manager 122.

The computing device 110 can include the processing unit 112 and the memory 114. In various embodiments, the computing device 110 can be a device that includes one or more processing units 112, such as a system-on-a-chip (SoC). In various embodiments, the computing device 110 can be a mobile computing device, such as a tablet computer, mobile phone, media player, and so forth that wirelessly connects to other devices in the vehicle. In some embodiments, the computing device 110 can be a head unit included in a vehicle system. Additionally or alternatively, the computing device 110 can be a detachable device that is mounted in a portion of a vehicle as part of an individual console. Generally, the computing device 110 can be configured to coordinate the overall operation of the media configuration system 100. The embodiments disclosed herein contemplate any technically-feasible system configured to implement the functionality of the media configuration system 100 via the computing device 110. The functionality and techniques of the media configuration system 100 are also applicable to other types of vehicles, including consumer vehicles, commercial trucks, airplanes, helicopters, spaceships, boats, submarines, and so forth.

The processing unit 112 can include one or more central processing units (CPUs), digital signal processing units (DSPs), microprocessors, application-specific integrated circuits (ASICs), neural processing units (NPUs), graphics processing units (GPUs), field-programmable gate arrays (FPGAs), and so forth. The processing unit 112 generally includes a programmable processor that executes program instructions to manipulate input data and generate outputs. In some embodiments, the processing unit 112 can include any number of processing cores, memories, and other modules for facilitating program execution. For example, the processing unit 112 could receive input from a user via the I/O devices 104 and generate pixels for display on an I/O device 104 (e.g., a display device). In some embodiments, the processing unit 112 can be configured to execute the media configuration manager 122 in order to control media playback on one or more devices via instances of the companion media application 124. In such instances, the media configuration manager 122 can mix media signals from multiple devices to provide a shared communications mode (e.g., shared media playlist, shared chat, etc.).

The memory 114 can include a memory module or collection of memory modules. The memory 114 generally comprises storage chips such as random-access memory (RANI) chips that store application programs and data for processing by the processing unit 112. In various embodiments, the memory 114 can include non-volatile memory, such as optical drives, magnetic drives, flash drives, or other storage. In some embodiments, separate data stores, such as data stores (not shown) included in the network 130 ("cloud storage") can connect to the media configuration manager 122 and/or the companion media application 124. The media configuration manager 122 within the memory 114 can be executed by the processing unit 112 in order to implement the overall functionality of the computing device 110 and, thus, coordinate the operation of the media configuration system 100 as a whole.

The media configuration manager 122 processes acquired data from the sensors 102 and/or the I/O devices 104 in order to control various communications and media playback on one or more in-vehicle consoles via instances of the companion media application 124. For example, a controlling occupant, such as the driver, a parent, an authorized user, etc., can access the media configuration manager 122 in order to select a shared playlist for two or more consoles included the vehicle. In such instances, two or more instances of the companion media application 124 operating in two or more of the consoles included in the vehicle can respond to commands sent by the media configuration manager 122 to cause playback of the same content item included in the shared playlist. In another example, the media configuration manager 122 can determine a subset of consoles within the vehicle that are participants in a common chat session, such as a video conference with the remote device 132. In such instances, the media configuration manager 122 can receive a set of media signals generated by the instances of the companion media application 124 participating in the chat session in order to generate a composite signal (e.g., combining the set of media signals into a single composite media signal), then send the composite signal to the remote device 132. Similarly, the media configuration manager 122 can receive a given media signal (e.g., one of the set of received media singles received from the consoles, one or more remote media signals, etc.) and distribute the given media signal to the instances of the companion media application 124 a console corresponding to each participant.

The companion media application 124 includes one or more instances of an application that performs various playback functions associated with content items, such as displaying a GUI for content item selection, an interface for playback of specific multimedia content items, control of a set of console components, and so forth. In various embodiments, the GUI can employ a window-and-object metaphor to provide a mechanism for user interaction with the computing device 110. Persons skilled in the art will recognize various operating systems and/or user interfaces that are suitable for incorporation into the companion media application 124. The companion media application 124 is configured to request and/or receive content from the data store 126, which stores various content items internally. Additionally or alternatively, the companion media application 124 receives content items from one or more content servers (not shown) via the network 130; in such instances, the companion media application 124 can download complete content items into the data store 126 and/or buffer content items using the data store 126. Further, the companion media application 124 is configured to cause playback of a given content item by interpreting the content item and presenting the content item via one or more of the I/O devices 104, such as a display device and/or one or more loudspeakers associated with a given console.

The sensors 102 can include one or more devices that perform measurements and/or acquire data related to certain subjects in an environment. In various embodiments, the sensors 102 can generate sensor data that is related to the user and/or objects in the environment that are not the user. In some embodiments, the sensors 102 can be coupled to and/or included within the computing device 110 and can send sensor data to the processing unit 112.

In various embodiments, the sensors 102 can include optical sensors, such as RGB cameras, infrared cameras, depth cameras, and/or camera arrays, which include two or more of such cameras. Other optical sensors can include imagers and laser sensors. In some embodiments, the sensors 102 can include physical sensors, such as touch sensors, pressure sensors, position sensors (e.g., an accelerometer and/or an inertial measurement unit (IMU)), motion sensors, and so forth, that register the body position and/or movement of the user. In some embodiments, the sensors 102 can include physiology sensors, such as heart-rate monitors, electroencephalography (EEG) systems, radio sensors, thermal sensors, galvanic skin response sensors (e.g., sensors that measure change in electrical resistance of skin caused by emotional stress), contactless sensor systems, magnetoencephalography (MEG) systems, and so forth. In some embodiments, the sensors 102 can include acoustic sensors, such as a microphone and/or a microphone array that acquires sound data. In such instances, the sound data can be processed by the media configuration manager 122 and/or the companion media application 124 performing various natural language (NL) processing techniques, sentiment analysis, and/or speech analysis in order to determine the semantic meaning of the phrases spoken in the environment.

In various embodiments, the media configuration manager 122 and/or the companion media application 124 can respond to the acquired sensor data in order to specify a specific media configuration. For example, the media configuration manager 122 can process image data from one or more image sensors 102 and/or pressure data from one or more pressure sensors 102 in order to determine whether a seat in the vehicle is occupied, and determine a specific person (e.g., corresponding to a user profile stored in the data store 126) that is occupying the seat. In another example, the media configuration manager 122 can acquire image data from the image sensors 102 in order to display the images and/or generate avatars for each occupant in the vehicle.

The data store 126 is a portion of the memory 114 that stores various data locally, such as content items, blocks of content items (e.g., cached blocks acquired when buffering), user profiles, and/or application data (e.g., secure application data, metadata, etc.) associated with the media configuration manager 122 and/or the companion media application 124. In various embodiments, the data store 126 can be included in volatile memory and can correspond to a section of nonvolatile memory. In some embodiments, the computing device 110 can sync data between the volatile memory and the nonvolatile memory so that copies of data are stored in both the volatile and nonvolatile memory. In some embodiments, the data store 126 can store downloaded content items received via network 130 in order to enable playback when access to the network 130 is unavailable or when the network resources of the vehicle are limited.

The I/O devices 104 can include devices capable of receiving input, such as a keyboard, a mouse, a touch-sensitive screen, a microphone, and other input devices for providing input data to the computing device 110. In various embodiments, the I/O devices 104 can be associated with a specific console, such as personalized screens mounted to a portion of a seat, personalized loudspeakers, console-specific input components, and so forth. Additionally or alternatively, the I/O devices 104 include various devices capable of providing output, such as a display screen, loudspeakers, and the like. In various embodiments, one or more of the I/O devices 104 can be incorporated in the computing device 110 or can be external to the computing device 110. In some embodiments, the computing device 110 and/or the one or more I/O devices 104 can be components of an advanced driver assistance system (ADAS) or an entertainment subsystem included in the vehicle. In various embodiments, the media configuration manager 122 and/or the companion media application 124 can respond to various inputs received by the one or more I/O devices 104. For example, the vehicle could include a head unit that includes a user interface. In such instances, the media configuration manager 122 could respond to one or more touch inputs and/or NL voice inputs received via the head unit.

Network 130 can enable communications between the computing device 110 and other devices in network 130 via wired and/or wireless communications protocols, satellite networks, V2X networks, including Bluetooth, Bluetooth low energy (BLE), wireless local area network (WiFi), cellular protocols, and/or near-field communications (NFC).

The remote device 132 is a computing device, such as a laptop, tablet, smart phone, cellular phone, desktop, teleconferencing system, etc., that communicates with the computing device 110. In some embodiments, the remote device 132 can include an instance of the companion media application 124. Additionally or alternatively, the remote device 132 can include other media applications, such as video conferencing software, audio call software, messaging software, and so forth. In such instances, the remote device 132 can use such media applications to communicate with various instances of the companion media application 124 operating within the vehicle.

Figure 1B:
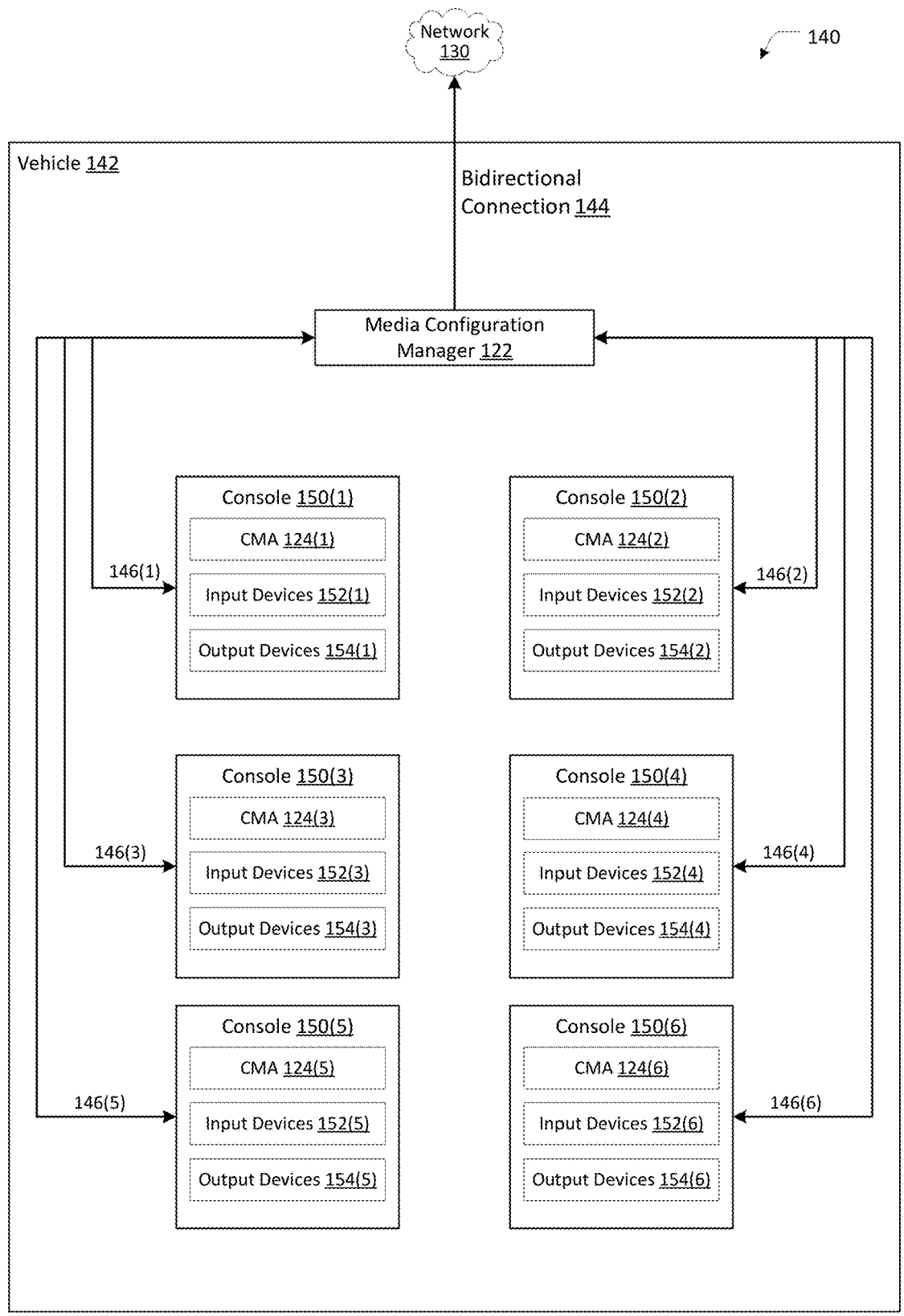
FIG. 1B illustrates an example vehicle that includes the media configuration system of FIG. 1A, according to various embodiments.

FIG. 1B illustrates an example vehicle 142 that includes the media configuration system 100 of FIG. 1A, according to various embodiments. As shown, an arrangement 140 of the media configuration system 100 includes, without limitation, a vehicle 142 and the network 130. The vehicle includes the media configuration manager 122, consoles 150 (e.g., 150(1), 150(2), etc.), and a bidirectional connection 144. Each console 150 includes, without limitation, companion media application (CMA) instances 124, input devices 152 (e.g., 152(1), 152(2), etc.), and output devices 154 (e.g., 154(1), 154(2), etc.).

In operation, the media configuration manager 122 can transmit one or more commands to one or more of the consoles 150 in order to control the operation of the respective CMA instances 124. In various embodiments, the media configuration manager 122 can control all or various subsets (e.g., consoles 150(5)-150(6), consoles 150(2), 150(3), and 150(6), etc.) of the consoles 150 simultaneously when operating in various communications modes. For example, the media configuration manager 122 can control a first subset of consoles 150 by providing a shared playlist, while controlling a second subset of consoles by establishing a shared chat session.

A given CMA instance 124 (e.g., 124(3)) operating in a given console 150 (e.g., 150(3)) can respond to the received commands by operating the output devices 154 (e.g., 154(3) to operate in a specific communications mode and/or provide playback for a specific content item. Each console 150 can also receive inputs from its respective user (e.g., an occupant of the vehicle 142) via the corresponding output devices 154. The CMA instance 124 can respond to the inputs by operating the console 150 individually (e.g., enable individual playback), or can send various signals, such as media signals 146 (e.g., 146(1), 146(2)) to the media configuration manager 122. In such instances, the media configuration manager 122 can distribute the received media signals 146 to other consoles 150 included in the vehicle 142. Additionally or alternatively, the media configuration manager 122 can transmit the media signals 146 to other devices outside the vehicle 142 via the bidirectional connection 144. In such instances, the media configuration manager 122 can combine multiple media signals 146 into a composite media signal (not shown) in order to efficiently transmit data using the bidirectional connection 144.

In various embodiments, the console 150 can be a mounted device, such as a rear-seat entertainment (RSE) unit mounted to a rear of a given seat and/or other areas of the vehicle 142. As an example, the console 150 can include a set of input devices 152 included in the console and/or connected to the console 150. For example, the console 150 can be hardware installed in a rear of a seat of the vehicle 142 that includes as input devices 152 installed in the rear of the seat, without limitation: (i) one or more cameras, (ii) one or more microphones directed toward the occupant sitting in the seat behind the seat where the one or more microphones are installed (e.g., a microphone mounted in the front right seat that is directed to the middle right seat), (iii) a touchscreen, (iv) one or more loudspeakers, (v) one or more connection ports for external output devices (e.g., headphones, a microphone, a headset), and/or (vi) a controller that includes a touchpad, keyboard, and/or one or more input buttons. As an example, console 150 can include as output devices 154 installed in the rear of the seat where the occupant is located, without limitation: (i) one or more loudspeakers, one or more microphones, and/or (ii) one or more connection ports for external output devices (e.g., headphones, a microphone, a headset).

In some embodiments, one or more components of the console 150 can be positioned proximate to the console 150. For example, a set of loudspeakers installed in the headrest of the occupant and/or mounted next to the headrest of the occupant headrest can be included in the output devices 154 for the console 150. Similarly, a microphone can be mounted in a portion of the seat of the occupant seat next to the headrest of the occupant. As will be discussed in further detail in FIG. 9, in some embodiments. The console 150 can control a set of loudspeakers positioned around a seat of an occupant seat to generate a sound zone that provides personalized sound to the occupant, where only the occupant hears the sound reproduced by the sound zone.

In other embodiments, the console 150 can include a portable device, such as a phone, tablet, and/or other portable device, that communicates with the media configuration manager 122 via a communication link, such as a wireless communication link or a wired connection via a connection port (not shown) included in the vehicle 142. For example, a given seat can include connection ports and/or network hotspots through which the portable device can establish the communication link. Additionally or alternatively, the console can also include mounting hardware, where an occupant can mount the portable device for use in the vehicle 142.

In various embodiments, the console 150 can be an RSE unit that is a component of a vehicle entertainment system that provides media content, such as audio data, video data, image data, and so forth, via the one or more output devices 154. In various embodiments, consoles 150 can be grouped within a specific area, such as a row of RSE units within a car. In some embodiments, consoles can be connected to a head unit (not shown) that includes an entertainment subsystem that controls the one or more RSE units. In various embodiments, an RSE unit that includes a given console 150 can act as a node that connects to the network 130. Similarly, the console 150 can be mounted to other areas of the vehicle 142, such as on the front compartment of the vehicle.

In some embodiments, the console 150 can be a separate device that communicates with the media configuration manager 122, such as a mobile device that establishes a connection with the computing device 110 that includes the media configuration manager 122. In various embodiments, the console 150 can be mobile or portable device, such as cellphones, tablets, laptops, wearable devices (e.g., watches, rings, bracelets, headphones, etc.), consumer products (e.g., portable loudspeakers, digital assistants, media players, etc.), and so forth.

In various embodiments, each console 150 operates with separate input devices 152 and/or output devices 154. In some embodiments, each console 150 can include separate cameras, microphones, and/or touch inputs (e.g., buttons, controllers, touch screens, etc.) as input devices 152. Additionally or alternatively, each console 150 can include separate loudspeakers (e.g., headrest loudspeakers, connected headphones, specific sound zones, etc.), display devices, haptic feedback devices, and/or the like, as output devices 154.

In-Vehicle Media Configuration System Operations

Figure 2:
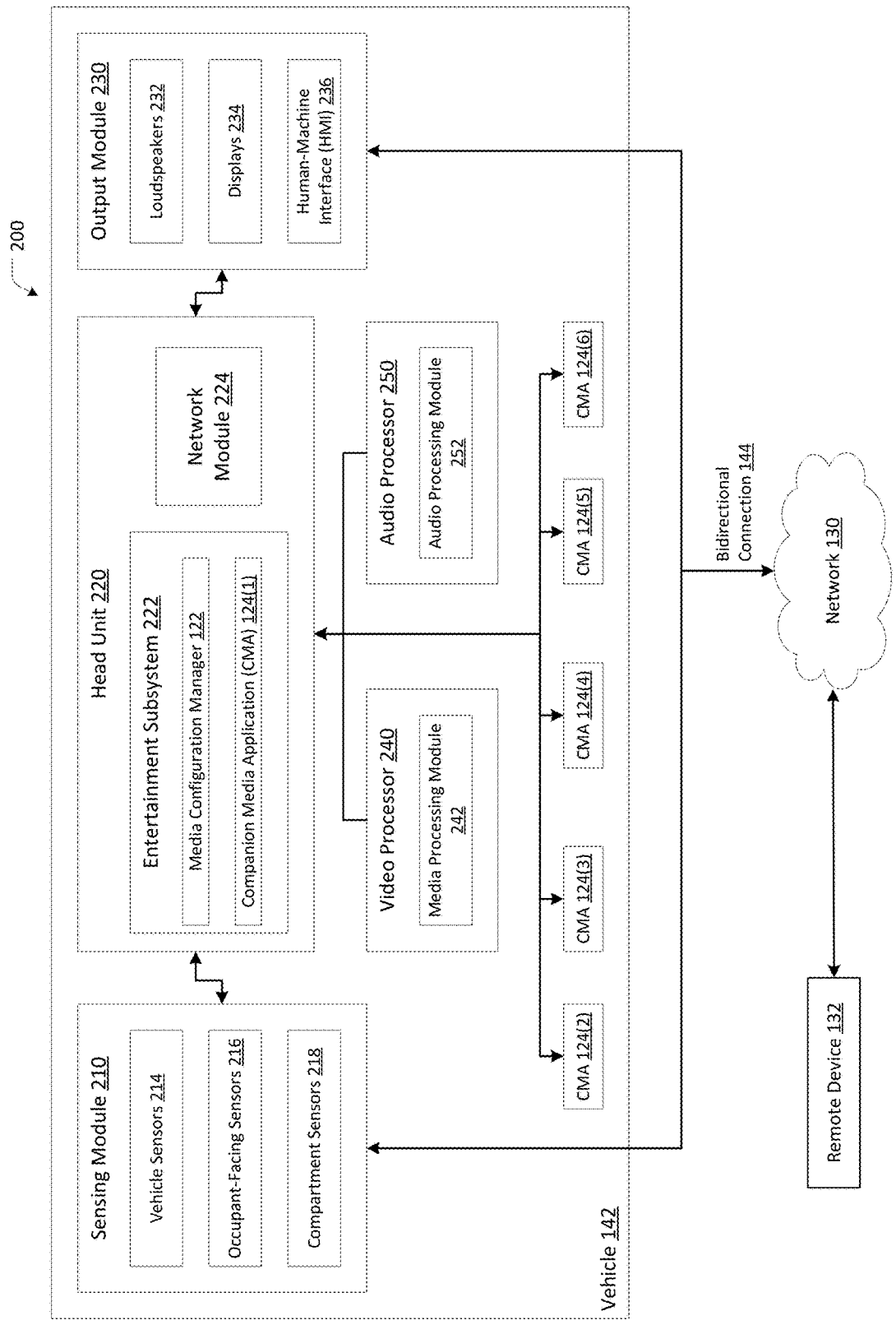
FIG. 2 illustrates an example vehicle system that includes the media configuration system of FIG. 1A, according to various embodiments.

FIG. 2 illustrates an example vehicle system 200 that includes the media configuration system of FIG. 1A according to various embodiments. As shown, the vehicle system 200 includes, without limitation, a vehicle 142, the network 130, and a remote device 132. The vehicle 142 includes, without limitation, a sensing module 210, a head unit 220, an output module 230, a video processor 240, an audio processor 250, and a set of CMA instances 124 (e.g., 124(1), 124(2), etc.). The sensing module 210 includes, without limitation, vehicle sensors 214, occupant-facing sensors 216, and compartment sensors 218. The head unit 220 includes, without limitation, the media configuration manager 122, the CMA instance 124(1), an entertainment subsystem 222, and a network module 224. The output module 230 includes, without limitation, loudspeakers 232, displays 234, and a human-machine interface (HMI) 236. The video processor includes a media processing module 242. The audio processor 250 includes an audio processing module 252.

In operation, the media configuration manager 122 can cause the video processor 240 and/or the audio processor 250 to process media signals 146 generated by the CMA instances 124(1)-124(6) operating in the consoles 150. In some embodiments, the media configuration manager 122 can cause the video processor 240 and/or the audio processor 250 to generate a composite media signal that is sent via the network 130 to the remote device 132. In such instances, the application operating on the remote device (e.g., a video chat application, a teleconferencing application, an CMA instance 124) can cause the remote device 132 to reproduce the composite media signal.

In various embodiments, the media configuration manager 122 can receive data from the sensing module 210 and can process the received data in order to provide configuration options to the controlling user (e.g., the user of the media configuration manager 122) via the output module 230. For example, the media configuration manager 122 can receive sensor data from the compartment sensors 218 in order to determine the arrangement of occupants within the vehicle 142. As will be discussed in further detail in FIGS. 5-7, the media configuration manager 122 can then generate and provide an image (e.g., a seat legend) representing the arrangement of the occupants within the vehicle 142.

The sensing module 210 includes multiple types of sensors, including vehicle sensors 214 (e.g., outward-facing cameras, accelerometers, etc.), occupant-facing sensors 216 (e.g., cameras, microphones, motion sensors, etc.), and/or compartment non-occupant facing sensors 218 (e.g., pressure sensors, temperature sensors, etc.). In various embodiments, the sensing module 210 provides a combination of sensor data that describes the context of the vehicle 142 and the occupants that are present within the vehicle 142. For example, the sensing module 210 can provide a set of values associated with the occupants (e.g., positions of occupants, noise level, etc.). In such instances, the media configuration manager 122 can identify which seats within the vehicle 142 that are occupied and the consoles that correspond to the occupied seats. For each of the identified consoles 150 the media configuration manager 122 can then determine the set or subset of the CMA instances 124(1)-124(6) that are to be operational.

In various embodiments, the vehicle sensors 214 can further include other external sensors. Such external sensors can include optical sensors, acoustic sensors, road vibration sensors, temperature sensors, etc. In some embodiments, the sensing module 210 and/or the network module 224 can acquire other external data, such as geolocation data (e.g., GNSS systems, including a global positioning system (GPS), Glonass, Galileo, etc.), demographic data, psychographic data, and so forth. In such instances, the media configuration manager 122 and/or the CMA instances 124 can respond to the received data. For example, the media configuration manager 122 can suggest a specific playlist based on a specific geolocation of the vehicle 142. In another example, a specific CMA instance 124 can suggest specific content items based on the demographic and/or psychographic information associated with a specific occupant. In some embodiments, navigation data and/or geolocation data can be combined to be associated with a particular media configuration. For example, upon the navigation subsystem detecting an expected route between known locations (e.g., a home location, a school location, and a work location), the media configuration manager 122 can respond to the detected route by selecting a specific communications mode and/or a specific media playlist associated with the route (e.g., selecting a "morning commute" configuration when traveling a route from home to work before 10 am).

The head unit 220 is a component of the vehicle 142 that is mounted at any location within a passenger compartment of the vehicle 142 in any technically-feasible fashion. In some embodiments, the head unit 220 can include any number and type of instrumentation and applications and can provide any number of input and output mechanisms. For example, the head unit 220 can enable users (e.g., the driver and/or passengers) to control the entertainment subsystem 222. The head unit 220 supports any number of input and output data types and formats, as known in the art. For example, the head unit 220 could include built-in Bluetooth for hands-free calling and/or audio streaming, universal serial bus (USB) connections, speech recognition, rear-view camera inputs via the sensing module 210, video outputs via the output module 230 for any number and type of displays 234, and any number of audio outputs 232. In general, any number of sensors (e.g., sensors 102, 214, 216, 218), displays 234, receivers, transmitters, etc., can be integrated into the head unit 220, or can be implemented externally to the head unit 220. In various embodiments, external devices can communicate with the head unit 220 in any technically-feasible fashion.

The entertainment subsystem 222 provides various information to the controlling user and/or one or more other occupants of the vehicle 142 via the output module 230. For example, the head unit 220 could provide to the driver route information associated with the vehicle 142 via the HMI 236. In various embodiments, the entertainment subsystem 222 can include the media configuration manager 122 and/or one or more CMA instances 124 (e.g., 124(1)). In such instances, the media configuration manager 122 and/or the CMA instance 124(1) can control the operation of various components associated with the entertainment subsystem 222, such as media sources (e.g., internal sources or external media providers via the network module 224) and/or the output devices (e.g., output devices 154, loudspeakers 232, displays 234, and/or HMI 236) included in the output module 230 and/or the respective consoles 150

The output module 230 performs one or more actions in response to actions performed by the head unit 220, the video processor 240, and/or the audio processor 250. For example, the output module 230 can generate one or more output signals in response to received media signals (e.g., video signals received from the video processor 240 and/or audio signals received from the audio processor 250) to drive the output of the loudspeakers 232 and/or the display 234. In another example, the output module 230 could generate one or more output signals to modify the human-machine interface (HMI) 236, controlled by the CMA instance 124(1), to display notification messages and/or alerts. In some embodiments, the HMI 236 can be a different component than the display 234, such as when the HMI 236 is included as part of the windshield. In such instances, the media configuration manager 122 can specify whether a notification is to be displayed via the display 234 or via the HMI 236.

The video processor 240 processes one or more video signals acquired by the CMA instances 124 (e.g., video content items, video feeds generated by cameras at each console 150, etc.) in the vehicle 142. The video processor 240 generates a video signal to drive one or more of the displays included in the vehicle 142 (e.g., output devices 154, display 234). The video processor 240 can perform various processing functions, such as deinterlacing, frame rate conversion, noise reduction, A/V synchronization, motion compensation, artifact removal, and so forth. In various embodiments, the video processor 240 can include a media processing module 242 that processes the one or more video signals, such as by mixing multiple media signals to generate a composite video signal.

For example, multiple consoles (e.g., consoles 150(3)-150(6), can be participants in a video call with the remote device 132. In such instances, the media processing module 242 can combine the separate video signals generated by each of the CMA instances 124(3)-124(6) operating the respective consoles 150(3)-150(6) to produce a composite video signal. The media configuration manager 122 can cause the video processor 240 to transmit the composite video to the participants in the video call, including the consoles 150(3)-150(6), and the remote device 132 via the bidirectional connection 144 and the network module 224.

The audio processor 250 includes various components to process and/or amplify one or more audio signals acquired by the devices in the vehicle 142. The audio processor 250 performs various techniques to process the audio signals, such as denoising, filtering, delaying, equalizing, and so forth. In some embodiments, the audio processor 250 can perform techniques to attenuate or suppress some audio signals while amplifying different audio signals. For example, when operating a shared communications mode, participants using a subset of consoles 150(3)-150(6) in a shared communication session (e.g., playing a game that includes non-continuous speaking) could initially receive different content items via their respective consoles 150(3)-150(6). In such instances, the consoles 150(3)-150(6) of the participants initially provide separate audio content items and/or different video content items. When a participant (e.g., an occupant operating console 150(4)) speaks, the audio processor 250 could attenuate the respective content items provided by the participating CMA instances 124(3)-124(6) and amplify the audio signal corresponding to the speech of a participant.

In some embodiments, each respective console 150 can include separate video processors 240 and/or audio processors 250. In such instances, the head unit 220 can include a separate video processor 240 and/or audio processor 250 that performs the mixing functions on behalf of a subset of the consoles 150. For example, a given console 150 can use its video processor 240 and/or audio processor 250 to process content items for playback, while transmitting media signals used in shared communications (e.g., a video chat with other consoles 150 and the remote device 132) to the head unit for mixing before the vehicle distributes the composite media signal.

Figure 3:
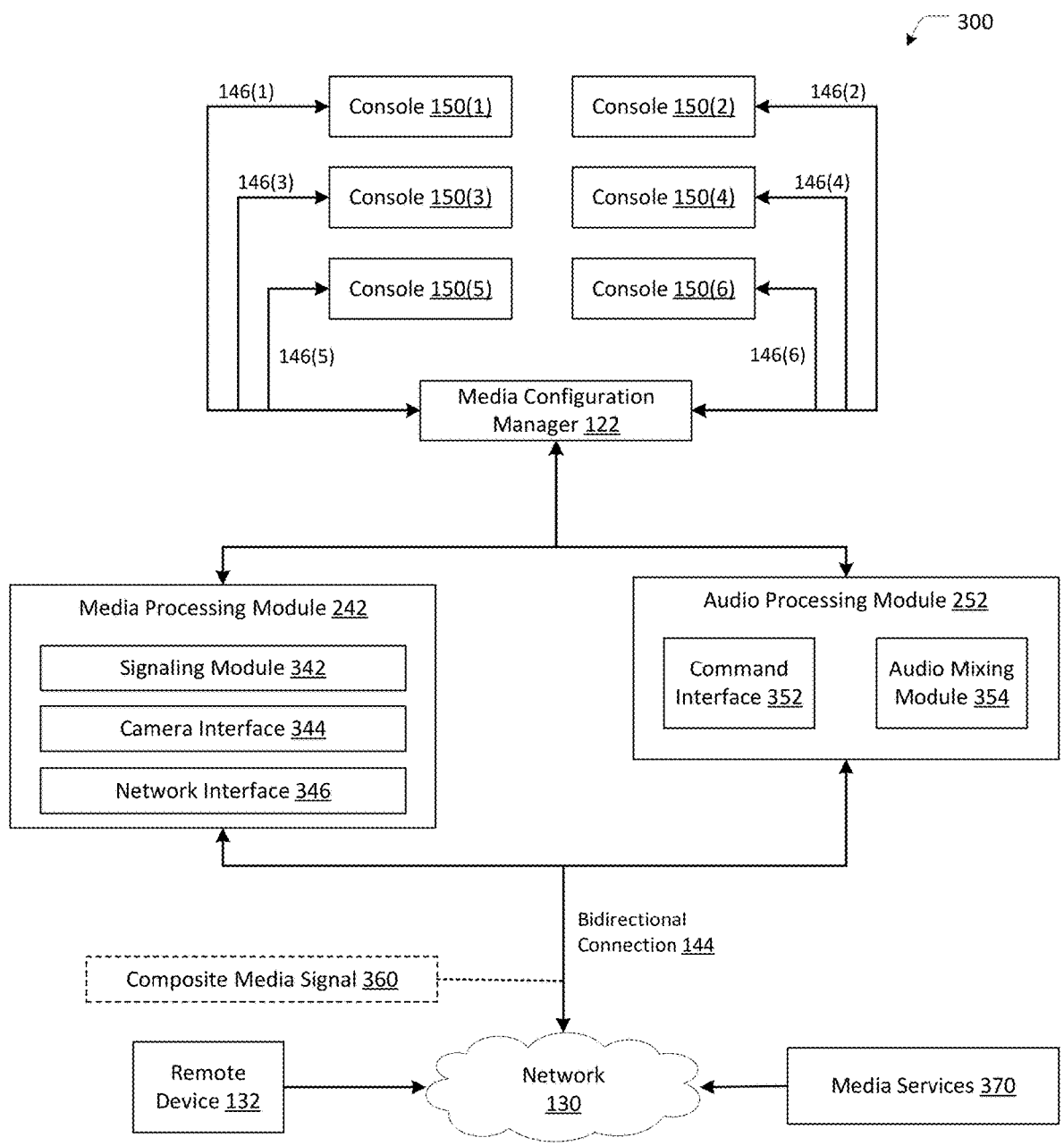
FIG. 3 illustrates a block diagram of a communication environment of the media configuration system of FIG. 1A processing a media session with the remote device, according to various embodiments.

FIG. 3 illustrates a block diagram of a communication environment 300 of the media configuration system 100 of FIG. 1 processing a media session with the remote device 132, according to various embodiments. As shown, the communication environment 300 includes, without limitation, the consoles 150, the media configuration manager 122, the media processing module 242, the audio processing module 252, the bidirectional connection 144, the network 130, and the remote device 132, and media services 370. The media processing module 242 includes, without limitation, a signaling module 342, a camera interface 344, and a network interface 346. The audio processing module 252 includes, without limitation, a command interface 352 and an audio mixing module 354.

In operation, the media configuration manager 122 provides commands to the audio processing module 252 and/or the media processing module 242 in order to process and transmit various audio signals and other media signals (e.g., video signals, text signals, metadata, etc.) associated with the respective CMA instances 124(1)-124(6) operating on the respective consoles 150(1)-150(6). In some embodiments, the media configuration manager 122 can cause the audio processing module 252 and/or the media processing module 242 to initially process media signals 146 associated with content items, such as streaming video sent from the media services 370, before distributing the media signals 146 to the recipient consoles 150. In such instances, the audio processing module 252 and/or the media processing module 242 can process the respective media signals in order to enhance the content items provided via the consoles 150. For example, the audio processing module 252 can add spatial information to an incoming audio signal and the media processing module 242 can synchronize the incoming video signal with the incoming audio signal before the console 150 provides playback via its CMA instance 124.

In various embodiments, the audio processing module 252 and media processing module 242 can combine the media signals 146 generated by multiple consoles 150 in order to generate a composite media signal 360 that includes each of the respective media signals 146. In such instances, the remote device 132 can receive the composite media signal 360 in lieu of receiving the multiple media signals from the respective consoles 150. The remote device 132 can display the composite media signal 360 as a combination communication signal, having a combined communication video and a combined audio signal.

In various embodiments, a subset of the consoles 150 can separately play content items. In such instances, the audio processing module 252 and the media processing module 242 can process the streaming media for playback via the respective consoles 150 in the subset. In some embodiments, a subset of the consoles 150 can be participants in a shared communication session, such as a shared chat session. Additionally or alternatively, the consoles 150 can acquire media signals 146 (e.g., audio signals, video signal, etc.) generated by the occupants of the vehicle 142 and transmit the media signals to the audio processing module 252 and the media processing module 242 for processing before the media configuration manager 122 causes the vehicle 142 to distribute the processed media signals (e.g., the separate media signals 146 and/or the composite media signal 360) to the other consoles 150 and/or the remote device 132.

In various embodiments, the media processing module 242 can operate in parallel with the audio processing module 252. Alternatively, the audio processing module 252 can be a component of the media processing module 242, or vice versa. In some embodiments, each console 150 can include separate instances of the audio processing module 252 and/or media processing module 242; in such cases, the media configuration manager 122 can coordinate the operation of the respective instances of the audio processing module 252 and/or the media processing module 242.

The media processing module 242 includes various modules to process multiple types of media signals, including video signals, text signals, and so forth. In various embodiments, the media processing module 242 includes, without limitation, a signaling module 342, a camera interface 344, and a network interface 346. The media processing module 242 performs various operations, such as compressing video for transmission over the bidirectional connection 144. For example, the media processing module 242 could use the signaling module 342 to combine one or more media signals 146 for a given shared chat session (e.g., media signals 146(2)-146(4)) into a composite video signal that includes a composite audio signal and composite media signal formed from the combined subset of the media signals 146. In such instances, the media configuration manager 122 could cause the composite audio signal and corresponding composite video signal to be transmitted to recipient devices (e.g., the remote device 132, the subset of participating consoles 150) as the composite media signal 360. In such instances, the recipient devices can produce the composite media signal 360 as a single video (e.g., an arrangement of multiple video streams in a common window). Alternatively, the recipient devices can split the composite media signal 360 into distinct media signals that the device presents in different windows or different panes.

The camera interface 344 can receive one or more camera feeds from the consoles 150 as a set of video signals included in the media signals 146. In some embodiments, the camera interface 344 can combine two or more camera feeds in order to generate a combined video that is displayed as a combined window. For example, as will be discussed in further detail in FIG. 10B, the console 150(2) can receive a subset of media signals 146 (e.g., 146(1)-146(3)) from the media processing module 242, where the subset of media signals 146 correspond to each participant in a shared chat session. In such instances, the CMA instance 124(2) can display each of the received media signals 146 in separate windows or panes. In another example, as will be discussed in further detail in FIGS. 10A, the console 150(1) can receive from the media processing module 242 the composite media signal 360 in lieu of receiving multiple media signals. In such instances, the CMA instance 124(1) can display the composite media signal 360 in a single window, where the single window displays multiple camera feeds.

The network interface 346 receives media from one or more sources, such as one or more media services 370 and/or the remote device 132. The network interface 346 then provides the received media to the media processing module 242 and/or the audio processing module 252 for further processing. Additionally or alternatively, the network interface 346 provides media signals, such as a single media signal 146 or the composite media signal 360, to the one or more media services 370 (e.g., providing the composite media signal 360 to a teleconferencing service). In some embodiments, the network interface 346 maintains the single bidirectional connection 144 with the network 130. In such instances, the media processing module 242 performs various techniques to generate the composite media signals 360 that the vehicle 142 transmits via the single bidirectional connection 144.

The media services 370 are various content provider services (e.g., video streaming services, audio streaming services, social media services, messaging services, etc.) and/or conferencing services that provide content from one or more sources, such as the remote device 132 and/or one or more remote data stores (not shown). In various embodiments, the media services 370 can include content delivery networks (CDN) that provide content items from the remote data stores ("cloud storage") to the consoles 150 via the bidirectional connection 144 for downloading and/or streaming. In various embodiments, the media configuration manager 122 can control the connection between the vehicle 142 and the one or more media services 370. In such instances, the media configuration manager 122 can perform various functions associated with connecting to the media services 370, including authentication, load management, feedback, and so forth.

The audio processing module 252 is included in audio processor 250 and performs various audio processing techniques associated with audio signals included in the media signals 146 transmitted from the consoles 150 and/or from remote sources (e.g., the remote device 132, the media services 370, etc.). In various embodiments, the audio processing module 252 can include a command interface 352 that receives commands from the media configuration manager 122 and modifies the audio signal based on the received command. For example, the audio processing module 252 can remove noise from one or more audio signals and/or remove unwanted sound sources. The audio mixing module 354 performs various functions to combine multiple audio signals into a composite audio signal that is included in the composite media signal 360. In various embodiments, the audio mixing module 354 can also perform various spatial rendering techniques in order to optimize the audio signal when reproduced by a specific set of loudspeakers within the vehicle 142.

In various embodiments, the command interface 352 can process one or more commands generated by the media configuration manager 122 in order to modify a set of audio signals. For example, as will be discussed in further detail in FIG. 5, the command interface 352 can receive one or more command signals from the media configuration manager 122 that relate to the intercom communications mode. In such instances, the audio processing module 252 can mute (e.g., attenuate the volume of the audio signal below a hearing threshold) one or more audio signals associated with the content items being played at one or more of the consoles 150 and instead transmit a speech signal (e.g., an audio signal received from the console 150(1) in the media signal 146(1)) to at least a subset of the consoles 150. In some embodiments, the audio processing module 252 can pause transmission of the audio signals of one or more content items being played by a subset of the consoles 150 and can buffer the received audio signals in memory while the intercom communications mode is active.

In some embodiments, the command interface 352 can control one or more output devices (e.g., the output module 230, the output devices 154 at the respective consoles 150, etc.) communicatively coupled to the audio processor 250. For example, a given console 150(4) can be coupled with output devices 154(4) that include a subset of loudspeakers positioned around a specific seat in the vehicle 142 (e.g., a set of headrest loudspeakers and/or other loudspeakers positioned around the right-middle seat). In such instances, the command interface 352 can generate control signals to control how the console 150(4) operates the set of loudspeakers in order for the occupant to hear the audio signal provided by the console 150(4). Additionally or alternatively, the command interface 352 can respond to other commands, such as various tuning commands (e.g., equalization, volume control, etc.), parental controls (e.g., parental overrides, content control locks, etc.), and so forth.

In various embodiments, the audio mixing module 354 performs various audio processing techniques on one or more audio signals in order to modify the audio signals for playback by the consoles 150 and/or the remote device 132. In some embodiments, the audio mixing module 354 can perform various combining techniques to combine multiple audio signals included in the media signals 146 into a composite audio signal. For example, during a group chat session that includes consoles 150(5)-150(6) as participants, the audio mixing module 354 can combine each of the speech signals received from the participating consoles 150(5)-150(6) (e.g., the audio component of media signals 146(5)-146(6)) into a composite audio signal in lieu of suppressing any of the audio signals for the participants. In some embodiments, the composite audio signal is transmitted to both a subset of consoles 150 included in the vehicle 142 and the remote device 132. In such instances, the media configuration manager 122 can cause a specific subset of loudspeakers included in the vehicle 142 (e.g., loudspeakers 232 and/or a subset of output devices 154) to reproduce the composite audio signal.

Additionally or alternatively, in various embodiments, the audio mixing module 354 can perform a ducking function by combining one or more speech signals, included in one or more of the received media signals 146, with an attenuated version of the audio signal for a content item in order to generate the composite audio signal. For example, when a subset of consoles 150 are operating in the shared communications mode, the audio mixing module 354 could generate composite audio signals for a subset of the consoles 150 upon receiving a speech signal from at least one participant.

As will be discussed in further detail in FIG. 11, in various embodiments, the audio mixing module 354 can add spatial information to a given audio signal. In some embodiments, the audio mixing module 354 can split an audio signal into multiple audio signals that are to be reproduced in different positions within the vehicle 142. For example, during a group chat session with the remote device 132, the audio processing module 252 could receive an audio signal from the remote device 132 that includes two or more distinct participants using the remote device 132. In such instances, the audio mixing module 354 can respond by generating separate speech signals for each of the distinct participants and add spatial information to each of the separate speech signals in order to have separate subsets of loudspeakers, located at different positions within the vehicle 142, reproduce the respective speech signals. In such instances, the different subset of loudspeakers reproducing the speech signals provides an impression that the distinct remote participants are at different positions within the vehicle 142.

In-Car Media Management Interfaces

Figure 4:
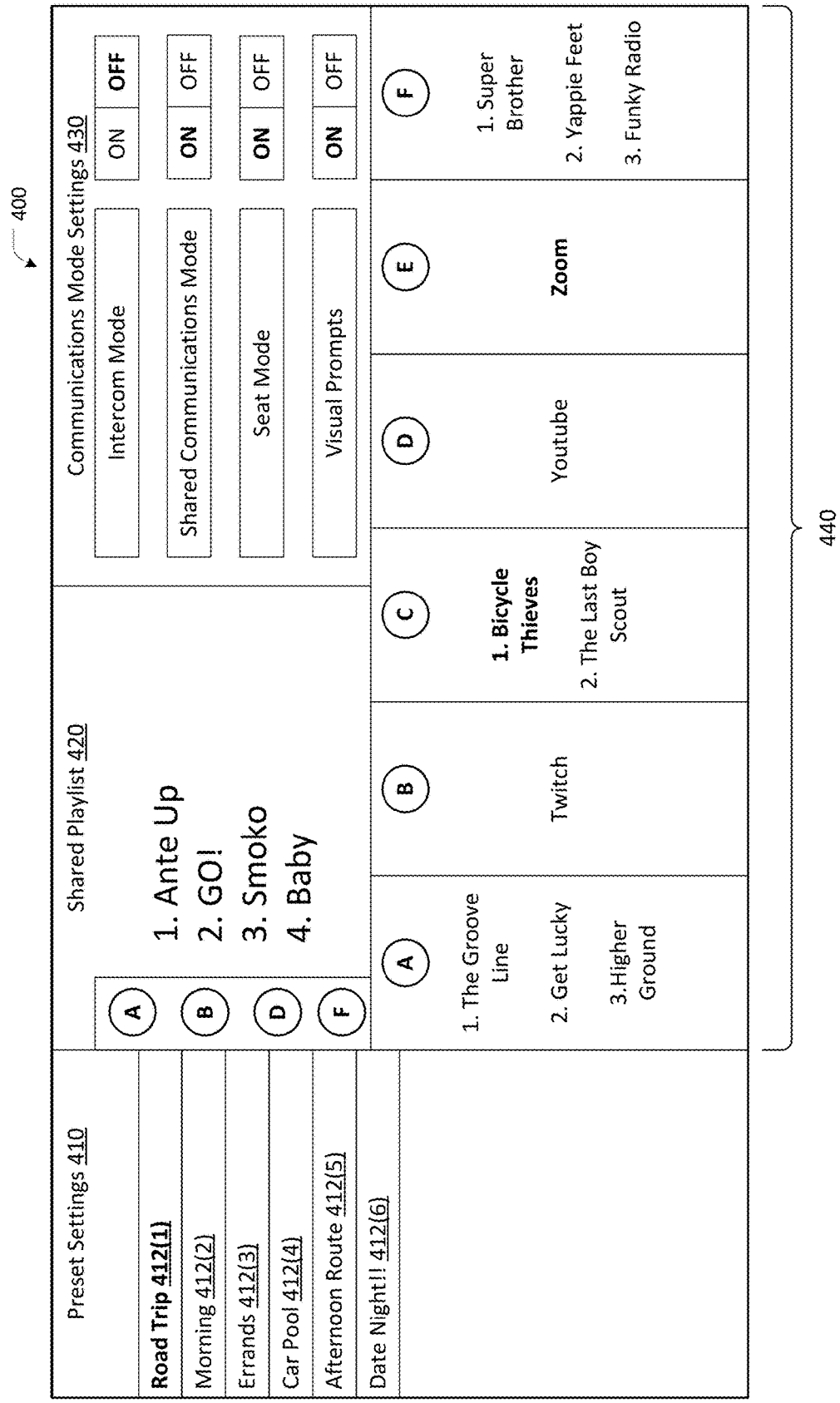
FIG. 4 illustrates an example view of a configuration screen provided by the media configuration system of FIG. 1A, according to various embodiments.

FIG. 4 illustrates an example view of a configuration screen 400 provided by the media configuration system 100 of FIG. 1A, according to various embodiments. As shown, the configuration screen 400 includes, without limitation, a presets section 410, a shared playlist section 420, a communications mode settings section 430, and individual playlists 440.

In operation, the media configuration manager 122 generates the configuration screen 400 in order to provide the controlling user (e.g., a driver or other authorized occupant) with an interface to provide selections to control the operation of one or more CMA instances 124 operating on the respective consoles 150. When viewing the configuration screen 400, the controlling user can select specific communications modes that are available to the consoles 150, monitor the individual playlists 440 of each occupant of the vehicle 142, modify communication settings, and/or select a specific preset configuration of settings and playlist ("preset").

The presets section 410 lists a set of stored presets 412 (e.g., 412(1), 412(2), etc.) that are stored in the data store 126. Each preset 412 specifies a set of configuration settings associated with the media configuration system 100, such as available communications modes, and one or more playlists, such as a shared playlist 420 and/or one or more individual playlists 440. In some embodiments, a given stored preset 412 can include a subset of configuration settings, such as the "date night" stored preset 412(6) storing a shared playlist without storing individual playlists. In some embodiments, a given preset 412 can include more settings than are in operation. For example, a "carpool" preset 412(4) can store individual playlists for ten individuals, while the configuration view displays only the six individual playlists 440 that correspond to the current occupants of the vehicle 142.

The shared playlist section 420 displays a list of participating occupants (denoted using the labeled circles "A", "B", etc.), and a listing of content items that are to be played by the subset of consoles corresponding to the participants. In various embodiments, the media configuration manager 122 can initially include all consoles 150 in the shared playlist 420 until individual participants opt-out of the shared playlist 420 (e.g., the "C" occupant selecting his or her individual playlist). In such instances, the media configuration manager 122 causes the content items included in the shared playlist 420 to be played on the subset of participant consoles (e.g., consoles 150(1), 150(2), 150(4), 150(6)) via the subset of corresponding CMA instances 124.

The communications mode setting section 430 displays a list of configurable settings associated with one or more communications modes. For example, as shown, the communications mode settings section 430 lists a shared communications mode (communications attenuating media playback), an intercom mode (communications interrupting media playback), a seat mode (individualized control and playback), and a prompts mode (enabling textual or image prompts to overlay the one or more windows provided by the CMA instances 124) as one or more available modes. In such instances, the controlling user can, via the media configuration manager 122, make one or more of these communications modes unavailable for use (e.g., setting the intercom mode to "OFF").

The configuration screen 400 displays one or more individual playlists 440, where the individual playlists 440 correspond to separate individual playlists for each occupant. In various embodiments, when the media configuration manager 122 causes a subset of the CMA instances 124 to operate in the seat mode, each occupant using the subset of CMA instances 124 can use their respective individual playlists 440 to select specific content items for playback or specific media services 370 for use. In some embodiments, the controlling user, via the media configuration manager 122, can use various parental controls to modify an individual playlist 440, such as by blocking specific media services 370 (e.g., blocking YouTube or Twitch), or adding specific content items to the playlist (e.g., adding specific videos or audio recordings to the playlist).

Figure 5:
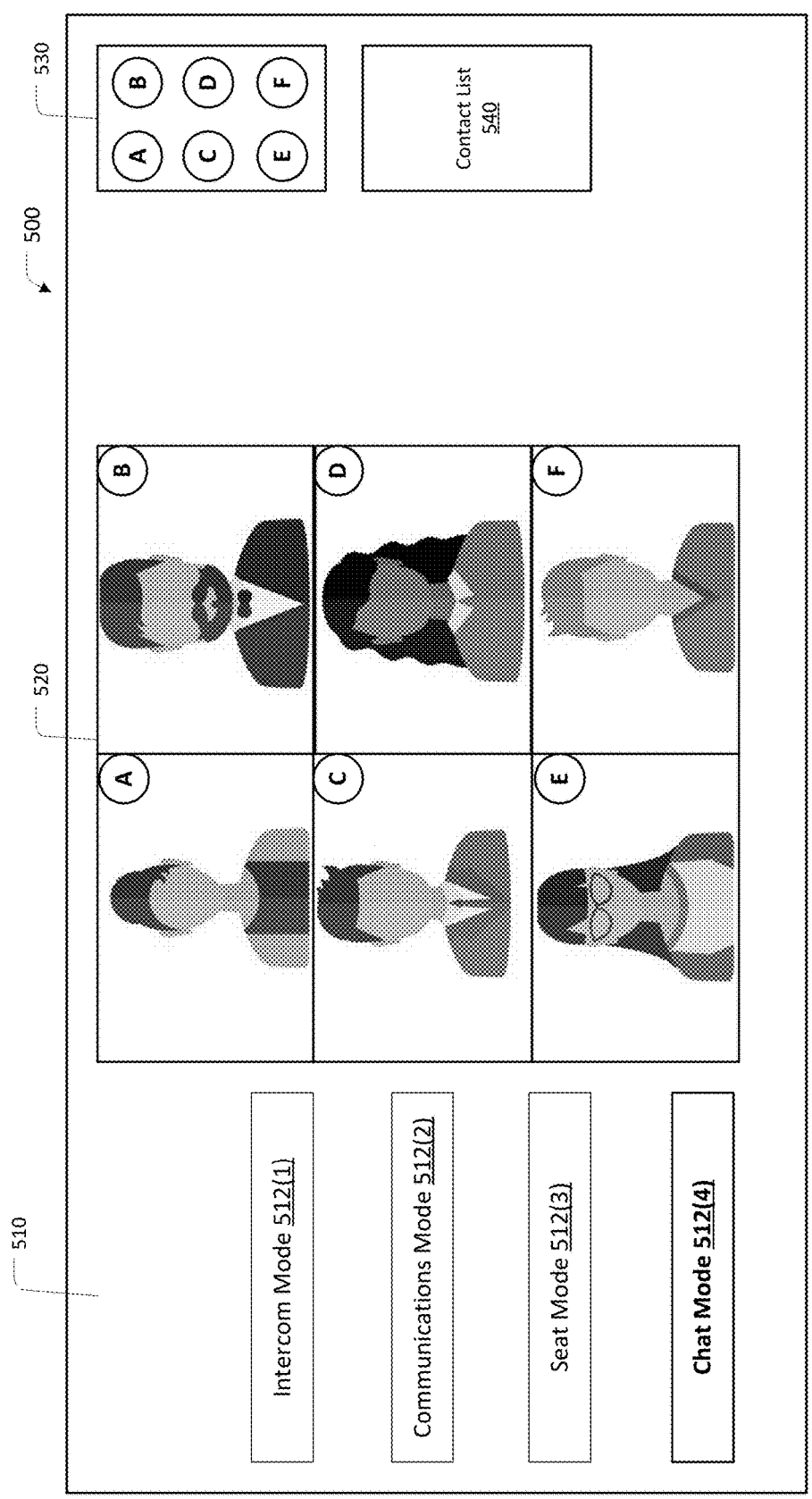
FIG. 5 illustrates an example view of a communication screen provided by the media configuration system of FIG. 1A, according to various embodiments.

FIG. 5 illustrates an example view of a communication screen 500 provided by the media configuration system 100 of FIG. 1A, according to various embodiments. As shown, the communication screen 500 includes, without limitation, a communications mode selector section 510, a viewing window 520, and a vehicle legend 530.

In operation, a user of the companion media application 124 can select a specific communications mode setting 512 (e.g., 512(1), 512(2), etc.) listed in the communications mode selector section 510. Based on the communications mode setting 512 selected by the occupant, the CMA instance 124 at the given console 150 updates the viewing window 520 to reflect the current communications mode. For example, an occupant operating console 150(3) that selects the chat mode setting 512(4) can cause the CMA instance 124(3) to update the viewing window 520, where the viewing window displays the participants in a shared video chat session.

In some embodiments, the communications mode selector screen 10 can display fewer or more communications mode settings 512 based on the settings specified by the controlling user via the communications mode settings section 430. For example, the communications mode selector section 510 can omit the intercom communications mode setting 512(1) as an option when the controlling user makes this communications mode unavailable. Additionally or alternatively, other communications mode settings (e.g., chat mode, parental control mode, etc.) are available.

When operating in the intercom communications mode setting 512(1), an occupant can interrupt playback and/or communications a subset of other consoles 150. In such instances, the CMA instances 124 cause the subset of consoles to stop or mute the playback and/or communication, provide a notification overlay to indicate that the active, and provide the communication generated by the occupant that is using the intercom communications mode. In some embodiments, the intercom mode interrupts playback at each console 150; alternatively, the occupant can select participants that are to receive the intercom interrupt via selecting occupants via the vehicle legend 530.

For example, the occupant at a given console 150 (e.g., console 150(1)), upon selecting the intercom communications mode setting 512(1), can generate an audio signal by speaking into a corresponding input device 152(1). In such instances, the media configuration manager 122 can cause the respective CMA instances 124 of a subset of selected consoles 150(3)-150(6) (e.g., CMA instances 124(3)-124(6)) to receive and play the audio signal generated by the occupant. Once the occupant has finished her speech, the occupant can unselect the intercom communications mode setting 512(1), where the media configuration manager 122 resumes the playback of content items on the subset of selected consoles 150(3)-150(6).

When operating in the shared communications mode setting 512(2), the media configuration manager 122 can distribute shared content items and/or media signals (e.g., media signals 146 and/or the composite media signal 360) the respective CMA instances participating in a given shared communication session. In some embodiments, the media configuration manager 122 can manage multiple shared communications sessions (e.g., two or more separate communications sessions with different subsets of the consoles 150). For example, a first subset of consoles (e.g., consoles 150(1), 150(2), 150(4), 150(6)) could participate in a shared game (e.g., I-spy, celebrity, the alphabet game, and/or the like), while the second subset (e.g., consoles 150(3), 150(4)) could participate in an in-vehicle 1:1 video chat session. In some embodiments, the media configuration manager 122 can include one or more chat communications settings (e.g., 1:1 chat sessions, shared chat sessions, etc.) as part of the shared communications mode setting 512(2); alternatively, the media configuration manager 122 can list the respective chat communications settings as additional settings listed in the communications mode selector section 510 (e.g., the chat mode communications setting).

In some embodiments, when operating in the shared communications mode, the media configuration manager 122 can cause the media processing module 242 and/or the audio processing module 252 to modify the content items that are currently playing. In some embodiments, the media configuration manager 122 can cause the participating CMA instances 124 to attenuate the volumes of content items and amplify audio signals received by one or more participating consoles 150. For example, when using the shared communications mode to play a game, the media configuration manager 122 can duck the various volume levels of content items being played at the participating consoles whenever one participant speaks. In some embodiments, the media configuration manager 122 can cause the audio processing module 252 to mix the audio signal of a given content item with the speech signal received from at least one of the participating consoles 150 in order to generate a composite audio signal. When the audio processing module 252 generates the composite audio signal, the media configuration manager 122 can cause the participating CMA instances 124 to play the composite audio signal.

When operating using the seat mode communications setting 512(3), the media configuration manager 122 enables one or more consoles 150 to operate independently from the other consoles 150. For example, as will be discussed in further detail in FIG. 6, an occupant of a given console 150 (e.g., console 150(2)) can select the seat mode communication setting 512(3) and the CMA instance 124 (e.g., CMA instance 124(2) can update the viewing window 520 to display a content item.

When operating using the chat mode setting 512(4), an occupant can initiate or join a chat session with at least one other participant. In some embodiments, the occupant can use the vehicle legend 530 to select one or more other occupants to join a given chat session. Additionally or alternatively, the other participant is a remote participant; in such instances, the CMA instance 124 can display the contact list 540 or a prompt for manual entry (e.g., phone number, email address, and/or other user profile identifiers) in order to identify remote participants that are to receive an invitation to the chat session. Upon identifying the applicable participants, the media configuration manager 122 can send invitations to the identified consoles 150 and/or remote device 132.

Once the participants accepted the invitation to the chat session, the media configuration manager 122 can receive media signals 146 from the respective participants and can cause the media processing module 242 and/or the audio processing module 252 to process the media signals 146 generated from each of the participants and transmit the processed signals (e.g., the media signals 146 and/or the composite media signal 360) to the other participants. In such instances, a given CMA instance 124 can update the viewing window 520 to include information about the chat session. For example, when the chat session is a video chat, the CMA instance 124 can display videos of each of the participants within the viewing window 520; when the chat is a voice or a text chat, the CMA instance 124 can list the participants and other information (e.g., text messages, metadata, etc.).

The vehicle legend 530 is an image that displays the arrangement of occupants in the vehicle 142. In various embodiments, the media configuration manager 122 can identify the person occupying each seat and determine the console 150 corresponding to each seat. The media configuration manager 122 can then provide an indication of the arrangement of the vehicle 142 by identifying the position of each occupant within the vehicle. When a given CMA instance 124 displays the vehicle legend 530, each icon included in the seat legend can be selectable; in such instances, an occupant can use the seat legend to select a subset of participants for a specific communication (e.g., shared playlist, intercom, chat session, etc.). When the occupant selects a single intended participant, the CMA instance 124 enters a 1:1 chat session; otherwise, when the occupant selects multiple intended participants, the CMA instance 124 initiates a multi-participant chat session and/or enters the shared communications mode.

Figure 6:
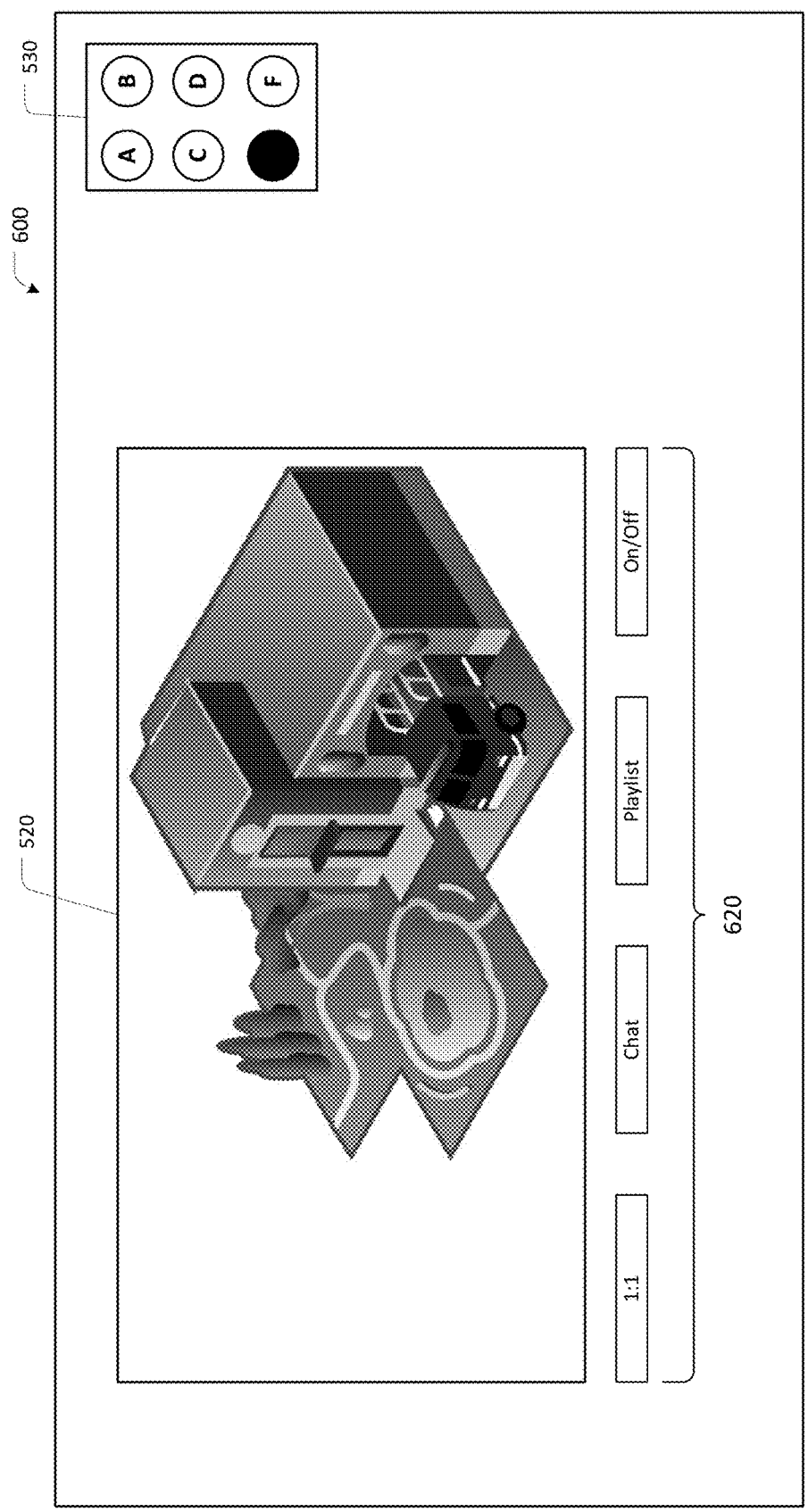
FIG. 6 illustrates a media viewing screen provided by the media configuration system of FIG. 1A, according to various embodiments.

FIG. 6 illustrates a media viewing screen 600 provided by the media configuration system 100 of FIG. 1A according to various embodiments. As shown, the media viewing screen 600 includes, without limitation, a viewing window 520, a set of selector icons 620, and the vehicle legend 530.

In operation, an occupant using a given console 150 can select, via the corresponding CMA instance 124, view a content item in the viewing window 520 when the CMA instance 124 is playing a content item (e.g., a video, metadata for an audio item, etc.). In some embodiments, the CMA instance 124 displays the vehicle legend 530 that highlights the position of the occupant within the vehicle. For example, as shown, the media viewing screen 600 for the CMA instance 124(5) highlights the position of the occupant that is seated in a position corresponding to the console 150(5).

In various embodiments, the CMA instance 124 can display a set of selector icons 620 that enable the occupant to modify what is playing and/or change communication modes. For example, the occupant can select one of the icons to switch to a different communications mode, change the content item being displayed, or turn off the display. For example, the CMA instance can initially be in the seat mode communications mode and updates the screen to the media viewing screen 600. The CMA instance 124 provides playback for the content items included in the individual playlist or the shared playlist via the display window 520. When the user selects the playlist icon, the CMA instance 124 can overlay the playlist over the display window 520 in order for the user to select a different content item.

Figure 7:
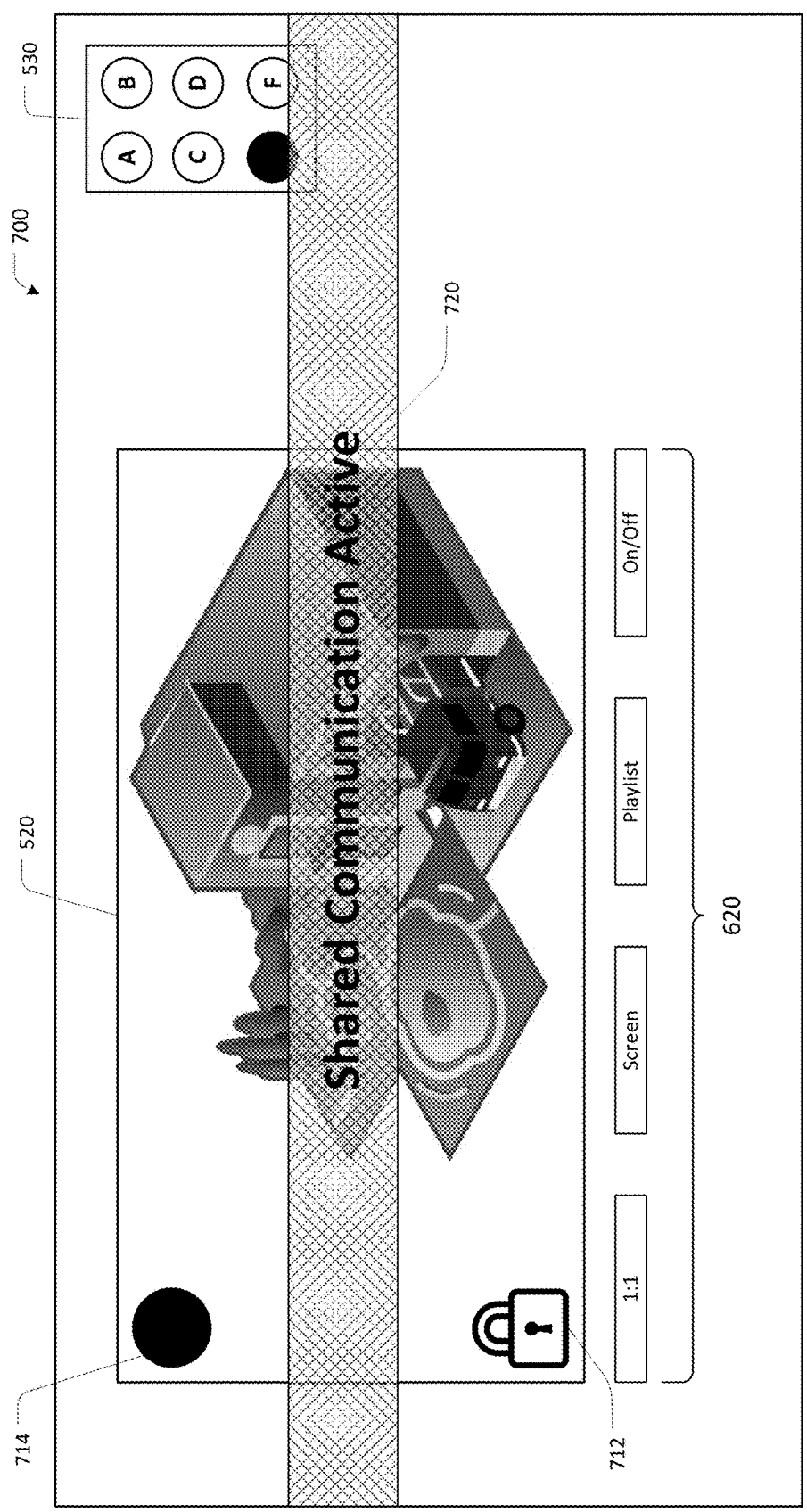
FIG. 7 illustrates a monitoring view provided by the media configuration system of FIG. 1A, according to various embodiments.

FIG. 7 illustrates a monitoring screen 700 provided by the media configuration system 100 of FIG. 1A according to various embodiments. As shown, the monitoring screen 700 includes, without limitation, viewing window 520, content lock icon 712, user icon 714, notification overlay 720, and vehicle legend 530.

In operation, a controlling user can select a parental control communications mode setting from the communications mode selector section 510 in FIG. 5. Upon selecting the parental control communications mode setting, the CMA instance 124 for the controlling user updates to display the monitoring screen 700, where the controlling user selects a specific occupant in order to access a view corresponding to the CMA instance 124 of the selected occupant. For example, a controlling user can select a specific icon from the vehicle legend 530 in order to mirror the viewing window 520 of the selected occupant. For example, as shown, the monitoring screen 700 for the CMA instance 124(5) highlights the position of the occupant that is seated in a position corresponding to the console 150(5), which is being monitored by the controlling user. In various embodiments, when the CMA instance 124 for the controlling user displays the monitoring screen 700, the CMA instance 124 can display parental controls, such as a content lock icon 712. When the controlling user selects the content lock icon 712, the media configuration manager 122 causes the corresponding CMA instance 124 for the monitored occupant (e.g., the CMA instance 124(5)) to stop playback of the specific content item or media services 370 and prevents the monitored occupant from initiating playback of blocked content items or media services 370 until the controlling user removes the content lock 712. In some embodiments, the controlling user can block multiple content items from a playlist and/or can select multiple occupants before adding content locks to the content items and/or media services 370.

The notification overlay 720 indicates specific information associated with the current communications mode. For example, when CMA instance 124 is operating in the shared communications mode, the CMA instance 124 can display a notification overlay 720 that indicates that the shared communications mode is active. In some embodiments, when the CMA instance 124 is operating using the intercom mode, CMA instance 124 can display a notification in the notification overlay 720 that the intercom is active and that the current media playback is paused while the intercom is active.

Figure 8:
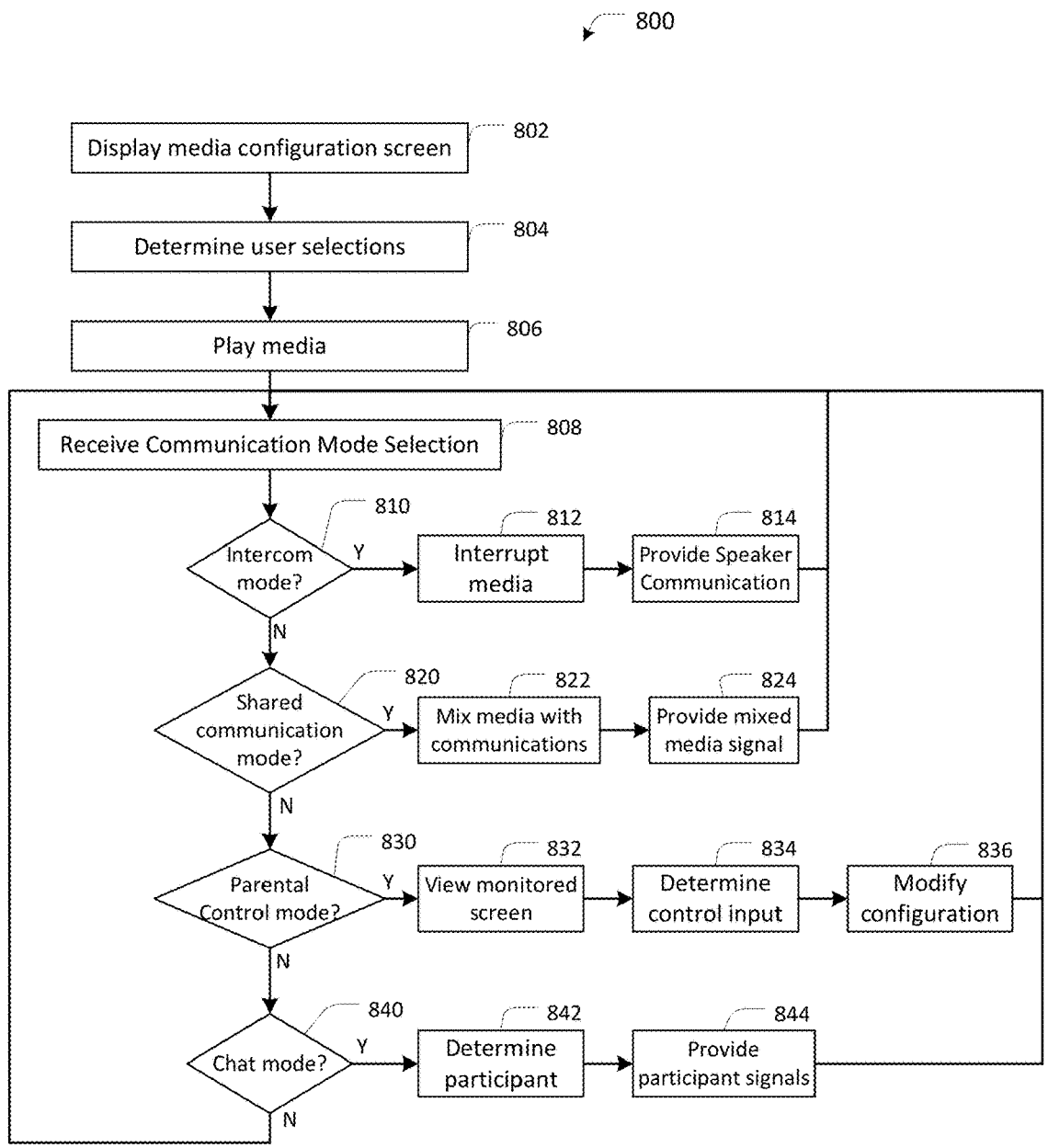
FIG. 8 is a flow diagram of method steps for configuring media provided by the media configuration system of FIG. 1A, according to various embodiments.

FIG. 8 is a flow diagram of method steps for configuring media provided by the media configuration system 100 of FIG. 1A according to various embodiments. Although the method steps are described with respect to the systems of FIGS. 1A-7, persons skilled in the art will understand that any system configured to perform the method steps, in any order, falls within the scope of the various embodiments.

As shown, the method 800 begins at step 802, where the media configuration manager 122 presents a configuration screen 400. In various embodiments, a controlling user (e.g., a driver, a parent, one or more other authorized occupants, etc.) can provide authentication to the media configuration manager 122 to provide identification as a controlling user; alternatively, a specific seat (e.g., the driving seat, the front passenger seat, etc.) can be designated a controlling user. Upon identifying the controlling user, the media configuration manager 122 can cause the companion media application 124 to display the configuration screen 400 for controlling one or more CMA instances 124. When viewing the configuration screen 400, the controlling user can monitor the playlists of other occupants, modify communication settings, and/or select a specific preset configuration of settings and playlist.

At step 804, the media configuration manager 122 determines the selections made by the controlling user. In various embodiments, the controlling user can provide one or more inputs to make one or more selections. In such instances, the media configuration manager 122 determines the selections made by the controlling user in order to control the CMA instances 124 that are operating in a specific communications mode and/or playing a specific content item.

At step 806, the media configuration manager 122 causes the companion media application 124 to play media based on the selection. In various embodiments, the controlling user can select a specific preset and/or specific playlist for playback. In such instances, the media configuration manager 122 identifies one or more CMA instances 124 (e.g., a subset of the CMA instances 124 as selected by the controlling user) and can cause the identified CMA instances 124 to play the selected content item. In some embodiments, the media configuration manager 122 can automatically select the shared playlist for playback by each CMA instance 124 when the media configuration manager 122 detects no specific selection for a content item. Alternatively, the media configuration manager 122 can initially have each CMA instance in a seat mode, where each occupant can individually control the playback of content items on their respective consoles 150.

At step 808, the companion media application 124 receives a selection of a specific communications mode. In various embodiments, upon the controlling user making one or more selections via the configuration screen 400, the CMA instance 124 at each respective console can cause the companion media application 124 to display a screen that enables the occupant to select an available communications mode settings 512, where the listed settings reflect the selections made by the controlling user. For example, the CMA instance 124 can display the communications screen 500 that includes the communications mode selector section 510. In another example, the CMA instance 124 can display the media viewing screen 600 that includes one or more selector icons 620 to switch to a specific communications mode. In various embodiments, the media configuration manager 122 can respond to the respective selections of one or more of the communications mode settings 512 made by one or more occupants via the one or more CMA instances 124 in order to determine the applicable communications mode for the one or more CMA instances 124.

At step 810, the companion media application 124 determines whether the communications mode selection is for the intercom communications mode. In various embodiments, the media configuration manager 122 can respond to the mode selection input at a given CMA instance 124 by determining whether the occupant selected the intercom communications mode setting 512(1). When the media configuration manager 122 determines that the occupant made the intercom selection, the media configuration manager 122 proceeds to step 812; otherwise, the media configuration manager 122 determines that the occupant did not select the intercom mode and proceeds to step 820.

At step 812, the media configuration manager 122 interrupts media playback on one or more consoles 150 that are to receive the intercom communication. In various embodiments, the CMA instance 124 can receive one or more inputs selecting one or more consoles 150 as recipients for the intercom communication. For example, upon selecting the intercom communication mode, the occupant can select each icon included in the vehicle legend 530 in order to select each console 150 in the vehicle 142 as intended recipients. In another example, the CMA instance 124 can display an overlay similar to overlay 720 that lists each occupant; the CMA instance 124 can then receive one or more inputs indicating a subset of occupants as the intended recipients. In various embodiments, the media configuration manager 122 can cause a subset of CMA instances 124 to interrupt media playback. In some embodiments, the subset of CMA instances 124 can pause media playback. Alternatively, the subset of CMA instances 124 can mute the media being played while the intercom communication takes place. In some embodiments, the subset of CMA instances 124 can provide a notification overlay 720 to indicate that the communications mode on the given CMA instance has been switched to the intercom communications mode.

At step 814, the media configuration manager 122 causes the subset of CMA instances 124 to provide the communication generated by the user. For example, after selecting the intercom mode, the occupant could then generate an audio signal by speaking into an input device 152 corresponding to the console 150. In such instances, the media configuration manager 122 can cause the subset of CMA instances 124 to receive and play the audio signal generated by the occupant. In some embodiments, the CMA instance 124 for each recipient occupant can play the audio signal generated by the speaking occupant while the audio signal of the content item remains paused or muted. In some embodiments, the CMA instance 124 can duck the audio signal for the content item while playing the audio signal of the speaking occupant. Additionally or alternatively, the CMA instance 124 can display an overlay similar to overlay 720 over at least a portion of the display of the recipient occupant display while the CMA instance 124 plays the audio signal of the speaking occupant. Once the speaking occupant has finished the intercom communication, the media configuration manager 122 can return to step 808 to wait for another mode selection.

At step 820, the media configuration manager 122 determines whether the communications mode selection is for the shared communications mode. When the media configuration manager 122 determines that the occupant used the given CMA instance 124 to select the shared communications mode setting 512(2), the media configuration manager 122 proceeds to step 822; otherwise, the media configuration manager 122 determines that the occupant did not select the shared communications mode and proceeds to step 830.

At step 822, the media configuration manager 122 can cause the media processing module 242 and/or the audio processing module 252 to modify the content items that are currently playing. In various embodiments, the CMA instance 124 can receive one or more inputs selecting one or more consoles 150 as recipients for the shared communication. For example, upon selecting the shared communication mode, the occupant can select a subset of icons displayed by the vehicle legend 530 in order to select one or more occupants as the intended recipients. In some embodiments, the media configuration manager 122 may, cause the participating CMA instances 124 to attenuate the volumes of content items and amplify audio signals received by one or more participating consoles 150. For example, when using the shared communications mode to play a game, the media configuration manager 122 can duck the various volume levels of content items being played at the participating consoles whenever one participant speaks. In some embodiments, the media configuration manager 122 can cause the audio processing module 252 to mix the audio signal of a given content item with the speech signal received from at least one of the participating consoles 150 in order to generate a composite audio signal. When the audio processing module 252 generates the composite audio signal, the media configuration manager 122 can proceed to step 824 and cause the participating CMA instances 124 to play the composite audio signal. Once the media configuration manager 122 has determined that the occupant has exited the shared communications mode, the media configuration manager 122 can return to step 808 to wait for another mode selection.

At step 830, the media configuration manager 122 determines whether a controlling user made a communications mode selection for the parental control mode. When the media configuration manager 122 determines that a controlling user selected the parental communications mode setting or selected to monitor a specific occupant, the media configuration manager 122 proceeds to step 832; otherwise, the media configuration manager 122 determines that the user did not select the parental control mode and proceeds to step 840.

At step 832, the media configuration manager 122 causes the companion media application 124 to display the monitoring screen 700 of one other occupant in the vehicle 142. In various embodiments, the CMA instance 124 can receive one or more inputs selecting a specific console 150 as the intended target for monitoring. For example, upon selecting the parental control mode, the controlling user can select an icon displayed by the vehicle legend 530 in order to select a specific occupant as the intended recipient. In various embodiments, the controlling user can select a specific occupant via the vehicle legend 530, and the CMA instance 124 operating in the parental control mode can respond by displaying a view of the screen of the selected occupant. In such instances, the monitoring screen 700 can mirror the current view provided by the CMA instance 124 of the monitored occupant.

At step 834, the media configuration manager 122 determines a control input made by the controlling user. In various embodiments, the media configuration manager 122 via the CMA instance 124 can determine a user control input, such as an input blocking or allowing a specific content item and/or a specific media source (e.g., specific websites and/or web services). In some embodiments, the control input control the access one or more occupants have to the respective CMA instances 124.

At step 836, the media configuration manager 122 can cause the corresponding CMA instance 124 to restrict or grant access to the CMA instance 124, a specific service, and/or a specific content item based on the control input. For example, the media configuration manager 122 can restrict access to the corresponding CMA instance 124 in response to a control input blocking the monitored occupant from using the CMA instance 124. In such instances, the monitored occupant can be restricted from using any function of the CMA instance 124 until the controlling user makes another control input granting access to the CMA instance 124. Once the user has exited the parental control mode, the media configuration manager 122 can return to step 808 to wait for another mode selection.

At step 840, the media configuration manager 122 determines whether the communications mode selection is for the chat mode. When the media configuration manager 122 determines that the user selected the chat session setting 512(4), the media configuration manager 122 proceeds to step 842; otherwise, the media configuration manager 122 determines that the occupant did not select the chat session setting 512(4) and returns to step 802.

At step 842, the media configuration manager 122, determines the participants that are to be invited to the chat session. In some embodiments, the occupant can select one or more other occupants of the vehicle via the vehicle legend 530. Additionally or alternatively, in some embodiments, the occupant can select one or more remote participants, such as by selecting participants from the contact list 540 or via manual entry. Upon identifying the intended participants, the media configuration manager 122 can send invitations to the identified CMA instances 124 and cause the corresponding CMA instances 124 to provide the invitation. In some embodiments, the identified CMA instances 124 can display an overlay providing a notification of the invitation to join the chat session. Additionally or alternatively, the identified CMA instances 124 can interrupt or duck the media playback of a content item in order to provide the invitation. In some embodiments, the media configuration manager 122 can send a message to the remote recipients in order to notify the remote user of the invitation to the shared communication session. For example, the media configuration manager 122 could send a message to the remote device 132 and the remote device 132 can generate a notification window identifying the occupant initiating the shared communication session and an icon to accept or reject the invitation.

At step 844, the media configuration manager 122 causes the respective CMA instances 124 to provide the media signals 146 for the participants in the chat session. In various embodiments, once the participants accepted the invitation to the chat session, the media configuration manager 122 can receive media signals 146 from the respective participants and can cause the media processing module 242 and/or the audio processing module 252 to process the signals generated from each of the participants and transmit the processed signals to the other participants. In such instances, a given CMA instance 124 can update the viewing window 520 to include information about the chat session. For example, when the chat session is a video chat, the CMA instance 124 can display videos of each of the participants within the viewing window 520; when the chat is a voice or a text chat, the CMA instance 124 can list the participants and other information (e.g., text messages, metadata, etc.). Once the user has exited the chat session, the media configuration manager 122 can return to step 808 to wait for another mode selection.

In-Car Communication Mixing

Figure 9:
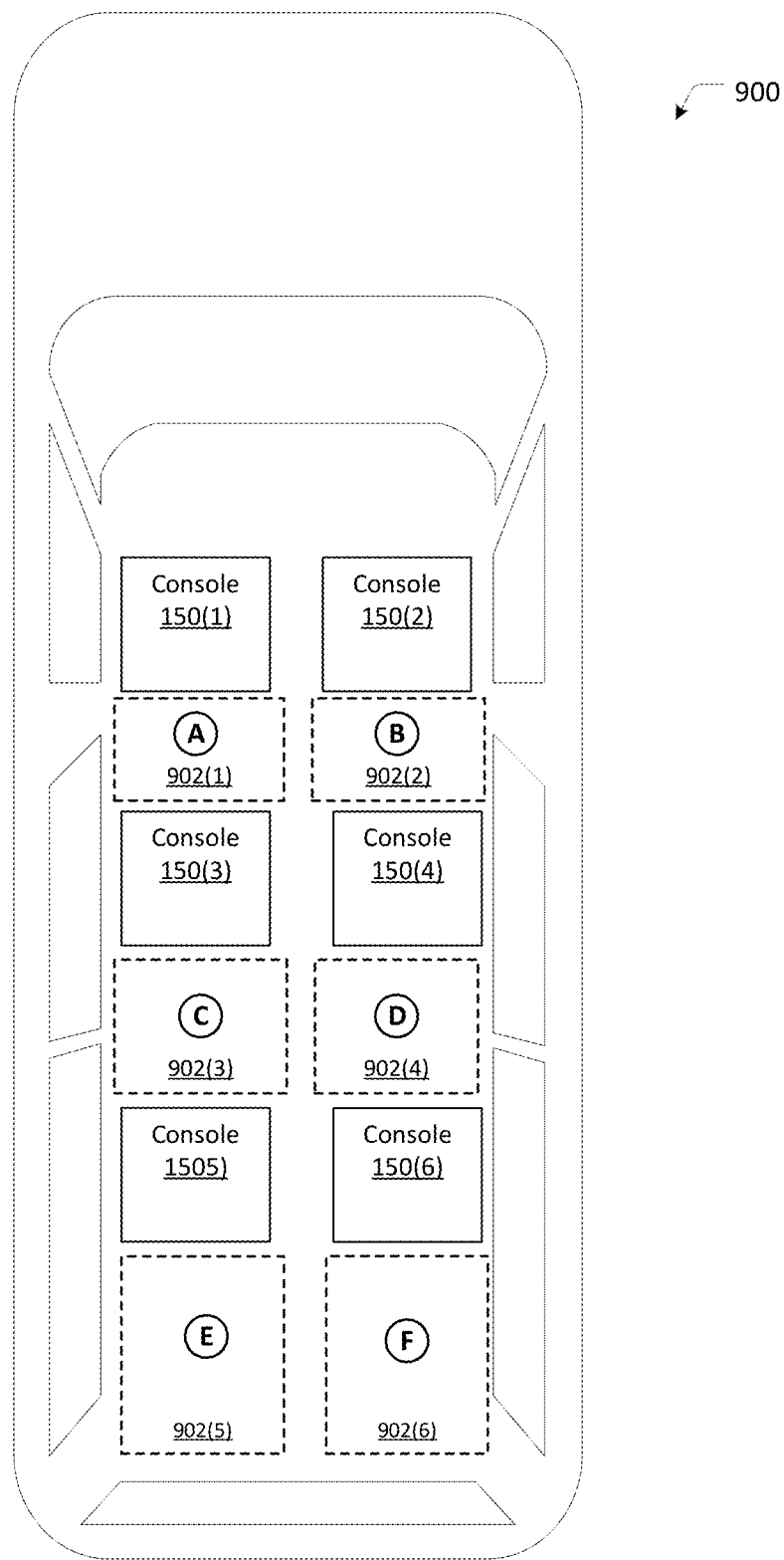
FIG. 9 illustrates an interior of an example vehicle including the media configuration system of FIG. 1B, according to various embodiments.

FIG. 9 illustrates an interior 900 of an example vehicle 142 including the media configuration system 140 of FIG. 1B, according to various embodiments. As shown, the interior 900 includes, without limitation, consoles 150 and sound zones 902 (e.g., 902(1), 902(2), etc.).

In various embodiments, the vehicle 142 includes various sets of loudspeakers that generate a plurality of sound zones 902(1)-902(6) that are located at distinct positions within the vehicle 142. In some embodiments, the vehicle 142 includes multiple sets of loudspeakers that generate sound zones 902(1)-902(6) in areas of the vehicle that correspond to individual seats. In such instances, each sound zone can be located in an area proximate to a seat such that the ears of the occupant are within the sound zone 902 when viewing the console. For example, as shown, when an occupant of the front row passenger seat views the console 150(2), the ears of the occupant can be located within the sound zone 902(2).

In various embodiments, the one or more output devices 154 associated with the corresponding console and/or other loudspeakers 232 positioned proximate to the seat can generate the sound zone 902. In such instances, the console 150 can provide sound to the occupant by reproducing the audio signal within the sound zone 902. In such instances, the occupant hears the reproduced sound while other occupants hear little or none of the reproduced sound. For example, the console 150(4) can generate personalized sound for an occupant of the middle right seat by driving loudspeakers to reproduce an audio signal in the sound zone 904(4). In such instances, occupants of other seats, such as the back row or the middle left seat, hear little or none of the audio signal reproduced by the console 150(4).

In some embodiments, the console 150 can deliver personalized sound to an occupant using headphones in lieu of reproducing sound in a sound zone 902. For example, the console 150 can be a mobile device that drives a pair of wired or wireless headphones that are connected to the console.

Figure 10A:
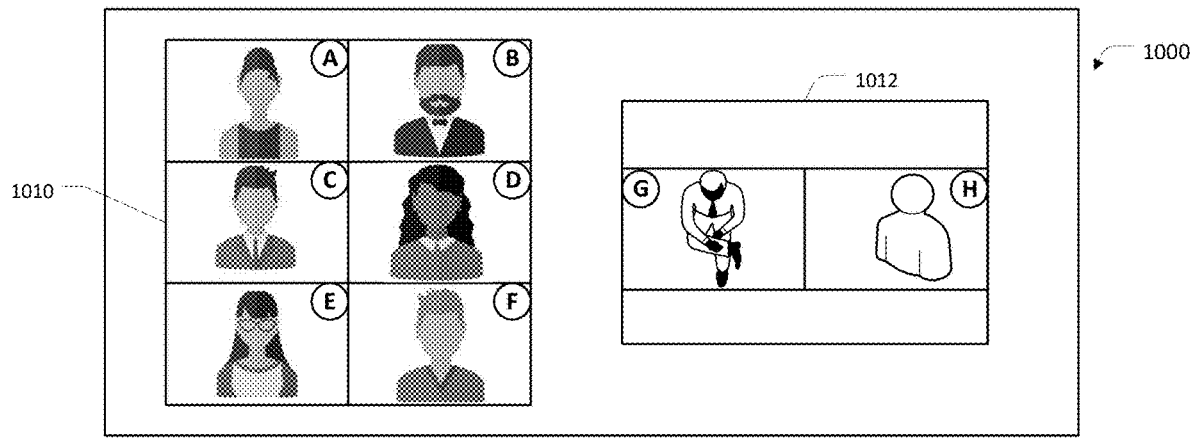
FIGS. 10A-10C illustrate various arrangements for communication views during a media call with a remote device, according to various embodiments.
Figure 10B:
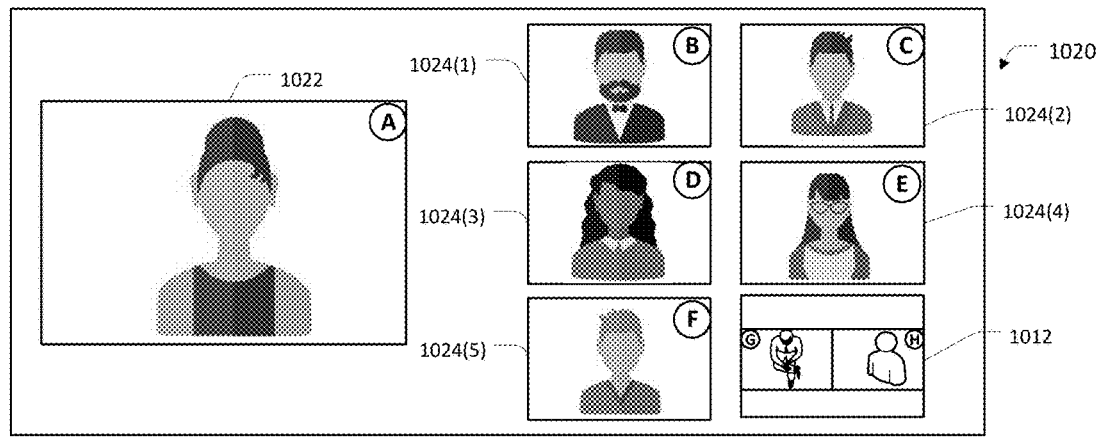
Figure 10C:
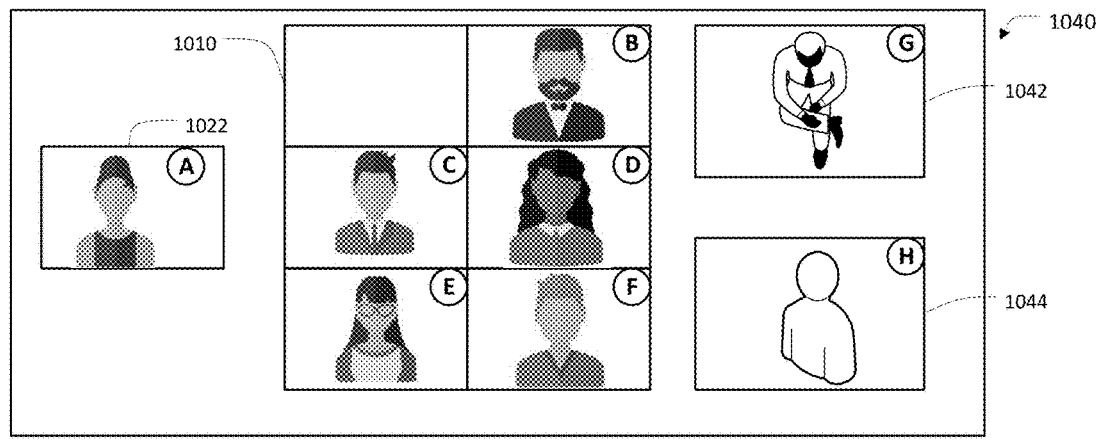

FIGS. 10A-10C illustrate various arrangements 1000, 1020, 1040 for communication screen 500 during a media call with a remote device 132, according to various embodiments. As shown, the arrangements 1000, 1020, 1040 include, without limitation, combined communication window 1010, individual participant windows 1022, 1024 (e.g., 1024(1), 1024(2), etc.), and remote participant windows 1012, 1042, 1044.

In various embodiments, a given CMA instance 124 operating in the chat mode can provide the communication screen 400 that displays windows of participants in the chat session using at least one of the arrangements 1000, 1020, 1040 based on preferences specified by the CMA instance 124 and/or the media configuration manager 122.

As shown in FIG. 10A, the CMA instance 124 displays an arrangement 1000 for a group video chat session with multiple remote participants. For the arrangement 1000, the companion media application 124 displays a combined communication window 1010 that includes each in-vehicle participant in the group chat session (e.g., consoles 150(1)-150(6)), and a combined remote participant window 1012 that combines all the remote participants in the chat session. As shown, the remote participants are participating through a teleconference system that provides a composite video feed for all of the remote participants. For example, two or more participants can share a remote device 132 to participate in the group chat session.

As shown in FIG. 10B, the CMA instance 124 displays an arrangement 1020 for a group video chat session with multiple remote participants. For the arrangement 1020, the companion media application 124 displays a participant window 1022 of the occupant, individual in-vehicle participant windows 1024(1)-1024(5), and the combined remote participant window 1012. In various embodiments, the CMA instance 124 can receive each of the individual media signals 146 for the participant consoles (e.g., media signals 146(1)-146(6)) from the media processing module 242 and can display each of the respective media signals 146(1)-146(6) in a distinct window. For example, the CMA instance 124(1) could display the camera feed of the occupant in the participant window 1022 and the respective camera feeds of other occupants in the participant windows 1024(1)-1024(5).

As shown in FIG. 10C, the CMA instance 124 displays an arrangement 1040 for a group video chat session with multiple remote participants. For the arrangement 1040, the CMA instance 124 displays a participant window 1022 of the user, the combined communication window 1010, and individual remote participant windows 1042, 1044.

In some embodiments, the CMA instance 124 can display each of the respective remote participants in separate remote participant windows 1042, 1044. In some embodiments, two or more remote participants can participate through a teleconference system that provides a composite video feed for all of the remote participants. In such instances, the media configuration manager 122 can cause the media processing module 242 to split the composite video feed into separate video signals, where the CMA instance 124 displays as the remote participant windows 1042, 1044.

Although FIGS. 10A-10C illustrate three possible arrangements 1000, 1020, 1040, the CMA instance can display various arrangements that include any combination of windows and/or panes displaying the occupant, other in-vehicle participants, and/or remote participants in separate windows or in combined, tiled windows.

Figure 11:
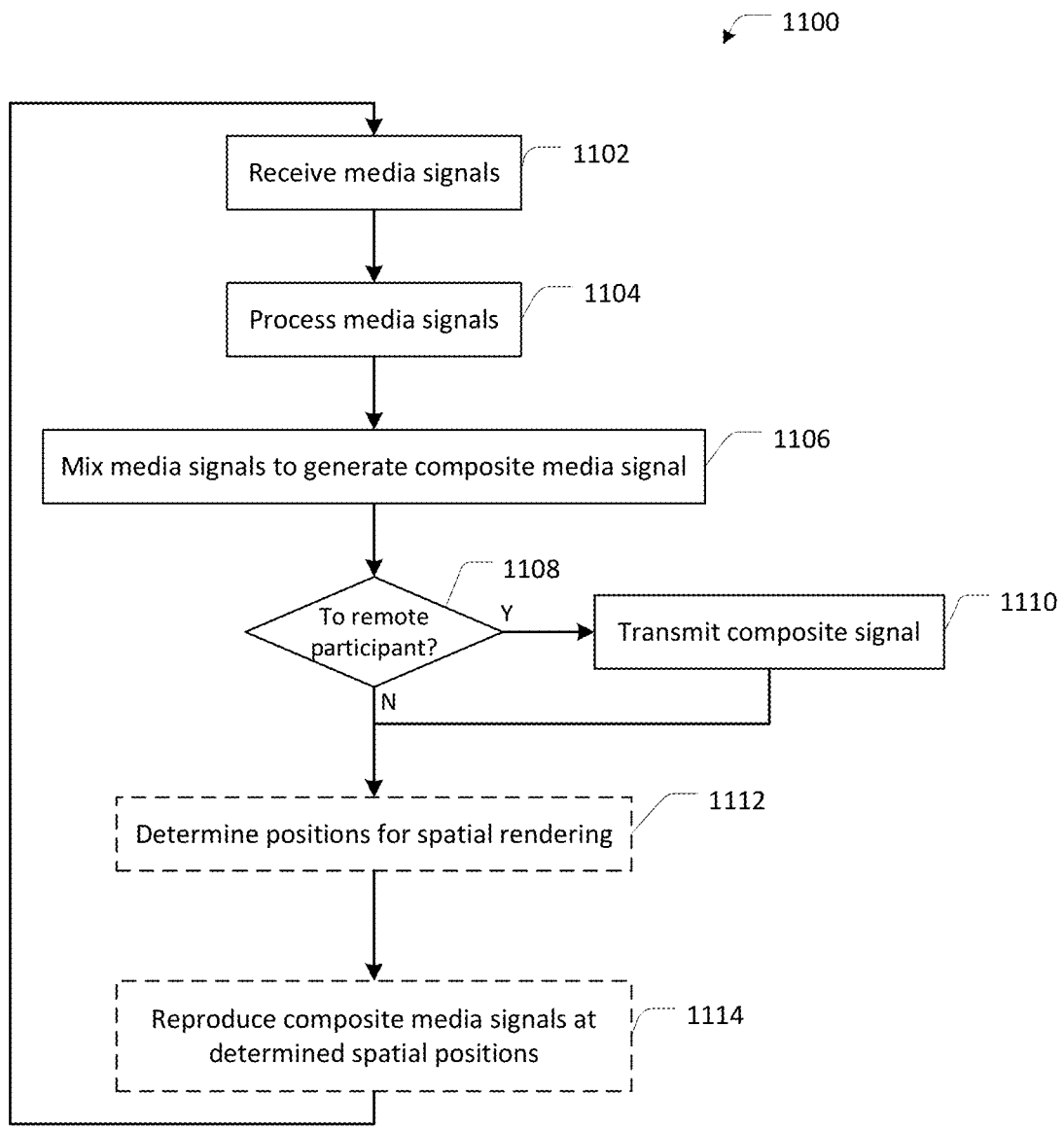
FIG. 11 is a flow diagram of method steps for mixing media signals generated by multiple in-vehicle devices during a media call, according to various embodiments.

FIG. 11 is a flow diagram of method steps for mixing media signals generated by multiple in-vehicle devices during a media call, according to various embodiments. Although the method steps are described with respect to the systems of FIGS. 1A-7 and 9-10C, persons skilled in the art will understand that any system configured to perform the method steps, in any order, falls within the scope of the various embodiments.

As shown, the method 1100 begins at step 1102, where the media configuration manager 122 receives a set of media signals 146. In various embodiments, the media configuration manager 122 included in the vehicle 142 can receive the set of media signals 146 and can could the media processing module 242 and/or the audio processing module 252 to receive the one or more media signals 146. In some embodiments, the media signals 146 can be a set of media signals 146 generated from a set of one or more consoles 150 included in the vehicle 142. Additionally or alternatively, the media signals 146 can be one or more media signals 146 received from remote sources, such as the remote devices 132 and/or media services 370.

At step 1104, the media processing module 242 and/or the audio processing module 252 processes the received media signals 146. In various embodiments, the media configuration manager 122 included in the vehicle can cause the audio processing module 252 and/or the media processing module 242 to perform various audio processing or video processing techniques to each of the received media signals 146. For example, the audio mixing module 354 included in the audio processing module 252 can perform various audio processing techniques to remove noise and/or unwanted audio sources from the respective media signals 146.

At step 1106, the media processing module 242 and/or the audio processing module 252 mixes the media signals in order to generate a composite media signal 360. In various embodiments, the media configuration manager 122 can cause the audio processing module 252 and/or the media processing module 242 to combine the multiple media signals 146 into the composite media signal 360. For example, the audio mixing module 354 could combine multiple audio signals included in the multiple media signals 146 to generate a composite audio signal. In another example, the media processing module 242 could combine multiple video signals in order to generate a composite video signal.

At step 1108, the media configuration manager 122 can determine whether the composite media signal 360 is to be transmitted to a remote participant. For example, the media configuration manager 122 could determine whether at least one occupant of the vehicle is a participant in a chat session with at least one remote participant using the remote device 132 and/or the remote media services 370. When the media configuration manager 122 determines that the chat session involves at least one remote participant, the media configuration manager 122 proceeds to step 1110; otherwise, the media configuration manager 122 determines that the chat session does not involve at least one remote participant and proceeds to step 1112.

At step 1110, the media processing module 242 and/or the audio processing module 252 transmits the composite media signal 360 to the at least one remote participant. In various embodiments, the media configuration manager 122 can cause the audio processing module 252 and/or the media processing module 242 to transmit the composite media signal 360 from the vehicle to the remote participants through the bidirectional connection 144. In various embodiments, the bidirectional connection 144 connects to a single device or service, such as the vehicle 142 establishing the bidirectional connection 144 with the remote device 132 (e.g., through a network or cellular connection established by vehicle 142 or a cellphone of one of the occupants, such as the controlling user) when the chat session includes a single remote participant, or the vehicle 142 establishing the bidirectional connection 144 with a media service 370, such as a teleconferencing service or system when the chat session includes multiple remote participants.

At step 1112, the vehicle 142 optionally determines positions for spatial rendering of the composite media signal 360. In various embodiments, the audio mixing module 354 included in the audio processing module 252 can perform various spatializing techniques in order to determine specific positions within the vehicle 142 that are to reproduce the audio signal included in the composite media signal 360. Additionally or alternatively, the media configuration manager 122 can determine the position of one or more audio signals received via the bidirectional connection 144 (e.g., the audio signals provided by the remote participants) based on various configuration settings, such as the position of the remote participant in a chat window (e.g., the position of the remote participant windows 1012, 1042, 1044 in a given arrangement 1000, 1020, 1040). In some embodiments, the audio mixing module 354 can split the composite media signal 360 in order to separate the composite media signal into multiple signals that the vehicle 142 can reproduce using different sets of loudspeakers such that occupants of the vehicle 142 hear each of the respective signals as if they originated from different locations within the vehicle 142.

At step 1114, the media configuration manager 122 optionally causes one or more loudspeakers in the vehicle 142 to reproduce the composite media signal 360 at one or more of the determined positions. In various embodiments, the audio processing module 252 can provide spatial information to one or more media signals 146 and/or the composite media signal 360 in order to cause specific sets of loudspeakers to reproduce spatialized audio signals such that one or more occupants of the vehicle hear the spatialized audio signals as if they originated from specific locations within the vehicle 142. In such instances, the media configuration manager 122 can specify one or more specific sets of loudspeakers that are to reproduce the spatialized audio signals. In various embodiments, the media configuration manager 122 can cause various output devices (e.g., the output devices 154, the loudspeakers 232, etc.) positioned at specific locations within the vehicle 142 to reproduce the composite media signal 360 and/or the audio signals of the remote participants. In some embodiments, when the audio mixing module 532 separates the composite media signal 360 into multiple signals, the media configuration manager 122 causes different sets of loudspeakers to reproduce the respective spatialized audio signals.

For example, during a call with two remote participants, the media configuration manager 122 can provide a command for a first set of loudspeakers near the in front of the driver to reproduce the speech signal of a first remote participant. The media configuration manager 122 can also provide a command for a second set of loudspeakers between the driver seat and the front row passenger seat to reproduce the speech signal of the second remote participant. Upon reproducing the composite media signal 360, the media configuration manager 122 returns to step 1102.

In sum, a media configuration manager controls the media output of one or more consoles included in an interior of a vehicle. In operation, the media configuration manager provides settings for media consumption by occupants of the vehicle, including shared modes of media consumption and communication, as well as separate zones that provide personalized media for the individual occupants.

The media configuration manager receives various inputs to enter into specific communications modes; based on the specific communications mode, the media configuration manager can alter the media provided on a console of a given occupant. In such instances, the media configuration manager can cause an instance of a companion application operating on a console of a given occupant to provide media playback when in a personalized mode, or participant communications when in chat mode. When in intercom mode interrupt the media being played and provide a communication of another occupant. When in the shared communication mode, the companion application instance alters playback, such as by dimming the video or lowering the volume of the audio being reproduced by the console of the given occupant and provides the communication of another occupant. In some embodiments, the media configuration manager can enable specific users, such as one or more controlling users, to monitor the screens of other consoles in the vehicle. In such instances, the media configuration manager can respond to inputs made by the controlling user to modify the configuration of the console associated with companion occupants, such as children.

In some embodiments, the media configuration manager controls in-vehicle communications between occupants, as well as communications between one or more occupants and remote participants. When the media configuration manager is managing a call with a remote participant, the media configuration manager receives media signals from one or more participating occupants. In some embodiments, the media signal can include audio signals, video signals, and/or other inputs. The media configuration manager causes various processing modules to process the individual media signals in order to clean the signal, such as by compressing the video, removing noise, and/or removing unwanted sound sources. The processing modules mix the media signal into a composite signal that includes two or more of the media signals provided by the in-vehicle occupants. The media configuration manager can then cause the processing module to transmit the signal from the vehicle to one or more remote participants over a single networking connection. In such instances, the remote device for the one or more remote participants receives the composite signal and renders the composite signal as a single source, such as a composite video of multiple in-vehicle participants. In some embodiments, the media configuration manager can also output the composite media signal within the vehicle. In such instances, the media configuration manager can determine a position within the vehicle from which to output the composite audio signal and can cause an output device, such as a spatial loudspeaker, to output the composite audio signal.

At least one technological advantage of the media configuration manager relative to the prior art is that, with the disclosed techniques, the media configuration manager provides integrated control and mixing for multiple media consoles within a single vehicle or area. In particular, by controlling which media output is provided via multiple media consoles, the media configuration manager provides greater control over what media is delivered to occupants while inside a vehicle. Further, by processing and mixing media signals provided by multiple occupants in the vehicle, the media configuration manager provides a cleaner media signal to other participants in a communication session, such as remote participants that receive a single composite signal from the vehicle. These techniques also lower the bandwidth requirements imposed on a vehicle to enable multi-participant video sessions, as the vehicle does not need to have network capacity for multiple network connections. These technical advantages provide one or more technological advancements over prior art approaches.

1. In various embodiments, a computer-implemented method comprises receiving a set of two or more first media signals from two or more consoles included in a vehicle, where each of the two or more consoles are included in a common communication session, combining the set of two or more first media signals to generate a composite media signal, transmitting, via a communication link, the composite media signal to a remote destination, receiving, via the communication link, a remote media signal from the remote destination, and causing the two or more first media signals and the remote media signal to be reproduced at the two or more consoles.

2. The computer-implemented method of clause 1, where each of the set of two or more first media signals comprise a video signal and an audio signal.

3. The computer-implemented method of clause 1 or 2, where each of the set of two or more first media signals comprise an audio signal and do not include a video signal.

4. The computer-implemented method of any of clauses 1-3, where the remote destination is one of a remote device executing a communication application or a teleconference service.

5. The computer-implemented method of any of clauses 1-4, where the remote media signal includes content from at least two separate sources, and the computer-implemented method further comprises separating the remote media signal into (i) a first remote media signal including first content from a first one of the separate sources, and (ii) a second remote media signal including second content from a second one of the separate sources.

6. The computer-implemented method of any of clauses 1-5, further comprising displaying video component of the set of two or more first media signals in a single video window, where the single video window displays the video component of a first one of the set of two or more first media signals in a first tile, and the single video window displays a video component of a second one of the set of two or more first media signals in a second tile.

7. The computer-implemented method of any of clauses 1-6, further comprising displaying a video component of a first one of the set of one or more first media signals in a first video windows, and displaying a video component of a second one of the set of one or more first media signals in a separate, second video window.

8. The computer-implemented method of any of clauses 1-7, further comprising displaying video components of both the first remote media signal and the second remote media signal in a single video window, where the single video window displays a video component of the first remote media signal in a first tile, and the single video window displays a video component of the second remote media signal in a second tile.

9. The computer-implemented method of any of clauses 1-8, further comprising displaying a video component of the first remote media signal in a first video windows, and displaying a video component of the second remote media signal in a separate, second video window.

10. The computer-implemented method of any of clauses 1-9, further comprising determining a position of a first window displaying a video component of the first content at a first one of the two or more consoles, spatializing, based on the position of the first window, a first audio signal included in the first content to generate a first spatialized audio signal, and driving a set of loudspeakers to reproduce the first spatialized audio signal.

11. The computer-implemented method of claim any of clauses 1-10, where the communication link comprises a single bidirectional connection between the vehicle and the remote destination.

12. In various embodiments, one or more non-transitory computer-readable media store instructions that, when executed by one or more processors, cause the one or more processors to perform the steps of receiving a set of two or more first media signals from two or more consoles included in a vehicle, where each of the two or more consoles are included in a common communication session, combining the set of two or more first media signals to generate a composite media signal, transmitting, via a communication link, the composite media signal to a remote destination, receiving, via the communication link, a remote media signal from the remote destination, and causing the two or more first media signals and the remote media signal to be reproduced at the two or more consoles.

13. The one or more non-transitory computer-readable media of clause 12, wherein each of the set of two or more first media signals comprise a video signal and an audio signal, or each of the set of two or more first media signals comprise an audio signal and do not include a video signal.

14. The one or more non-transitory computer-readable media of clause 12 or 13, wherein the remote media signal includes content from at least two separate sources, and the steps further comprises separating the remote media signal into (i) a first remote media signal including first content from a first one of the separate sources, and (ii) a second remote media signal including second content from a second one of the separate sources.

15. The one or more non-transitory computer-readable media of any of clauses 12-14, wherein the steps further comprise determining a position of a first window displaying a video component of the first content at a first one of the two or more consoles, spatializing, based on the position of the first window, a first audio signal included in the first content to generate a first spatialized audio signal, and driving a set of loudspeakers to reproduce the first spatialized audio signal.

16. The one or more non-transitory computer-readable media of any of clauses 12-15, wherein the steps further comprise determining a position of a first window displaying at least a first one of the set of two or more first media signals, spatializing, based on the position of the first window, a first audio signal included in the first one of the set of two or more first media signals to generate a first spatialized audio signal, and driving a set of loudspeakers to reproduce the first spatialized audio signal.

17. The one or more non-transitory computer-readable media of any of clauses 12-16, wherein the steps further comprise determining a position of an occupant within the vehicle associated with at least a first one of the set of two or more first media signals, spatializing, based on the position of the occupant within the vehicle, a first audio signal included in the first one of the set of two or more first media signals to generate a first spatialized audio signal, and driving a set of loudspeakers to reproduce the first spatialized audio signal.

18. The one or more non-transitory computer-readable media of any of clauses 12-17, wherein the steps further comprise transmitting the remote media signal to the two or more consoles within the vehicle.

19. The one or more non-transitory computer-readable media of any of clauses 12-18, where the communication link comprises a single bidirectional connection between the vehicle and the remote destination.

20. In various embodiments, a system comprises a memory storing an application, and a processor coupled to the memory that executes the application by performing the steps of receiving a set of two or more first media signals from two or more consoles included in a vehicle, where each of the two or more consoles are included in a common communication session, combining the set of two or more first media signals to generate a composite media signal, transmitting, via a communication link, the composite media signal to a remote destination, receiving, via the communication link, a remote media signal from the remote destination, and causing the two or more first media signals and the remote media signal to be reproduced at the two or more consoles.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
   receiving, by a media configuration manager operating in a vehicle, a respective video signal from each of two or more consoles included in the vehicle, wherein each of the two or more consoles are included in a common communication session;
   combining, by the media configuration manager, the respective video signals to generate a composite media signal;
   transmitting, by the media configuration manager, via a communication link, the composite media signal to a teleconference service operating at a remote destination;
   receiving, by the media configuration manager, via the communication link, a remote media signal from the teleconference service; and
   causing, by the media configuration manager, the respective video signals and the remote media signal to be reproduced at the two or more consoles.

2. The computer-implemented method of claim 1, further comprising:
   receiving at least an audio signal,
   wherein the composite media signal further includes at least the audio signal.

3. The computer-implemented method of claim 1, wherein one of a remote device executing a communication application transmits the remote media signal to the teleconference service.

4. The computer-implemented method of claim 1, wherein:
   the remote media signal includes content from at least two separate sources; and
   the computer-implemented method further comprises separating, by the media configuration manager, the remote media signal into:
   (i) a first remote media signal including first content from a first one of the separate sources, and
   (ii) a second remote media signal including second content from a second one of the separate sources.

5. The computer-implemented method of claim 4, further comprising:
   displaying, in a single video window, the respective video signals, including:
   a first video signal of the respective video signals in a first tile, and
   a second of the respective video signals in a second tile.

6. The computer-implemented method of claim 4, further comprising:
   displaying a first video signal of therespective video signals in a first video window; and
   displaying a second video signal of the respective video signals in a separate, second video window.

7. The computer-implemented method of claim 4, further comprising:
   displaying video components of both the first remote media signal and the second remote media signal in a single video window,
   wherein the single video window displays a video component of the first remote media signal in a first tile, and the single video window displays a video component of the second remote media signal in a second tile.

8. The computer-implemented method of claim 4, further comprising:
   displaying a video component of the first remote media signal in a first video window; and
   displaying a video component of the second remote media signal in a separate, second video window.

9. The computer-implemented method of claim 4, further comprising:
   determining a position of a first window displaying a video component of the first remote media signal at a first one of the two or more consoles;
   spatializing, based on the position of the first window, a first audio signal included in the first remote media signal to generate a first spatialized audio signal; and
   driving a set of loudspeakers to reproduce the first spatialized audio signal.

10. The computer-implemented method of claim 1, wherein the communication link comprises a single bidirectional connection between the vehicle and the remote destination.

11. One or more non-transitory computer-readable media storing instructions that, when executed by one or more processors, cause the one or more processors to perform the steps of:
   receiving, by a media configuration manager operating in a vehicle, a respective video signal from each of two or more consoles included in the vehicle, wherein each of the two or more consoles are included in a common communication session;
   combining, by the media configuration manager, the respective video signals to generate a composite media signal;
   transmitting, by the media configuration manager, via a communication link, the composite media signal to a teleconference service operating at a remote destination;
   receiving, by the media configuration manager, via the communication link, a remote media signal from the teleconference service remote destination; and
   causing, by the media configuration manager, the respective video signals and the remote media signal to be reproduced at the two or more consoles.

12. The one or more non-transitory computer-readable media of claim 11, wherein the steps further comprise:
   receiving at least an audio signal,
   wherein the composite media signal further includes at least the audio signal.

13. The one or more non-transitory computer-readable media of claim 11, wherein:
   the remote media signal includes content from at least two separate sources; and
   the steps further comprise separating, by the media configuration manager, the remote media signal into:

(i) a first remote media signal including first content from a first one of the separate sources, and
(ii) a second remote media signal including second content from a second one of the separate sources.

14. The one or more non-transitory computer-readable media of claim 13, wherein the steps further comprise:
determining a position of a first window displaying a video component of the first remote media signal at a first one of the two or more consoles;
spatializing, based on the position of the first window, a first audio signal included in the first remote media signal to generate a first spatialized audio signal; and
driving a set of loudspeakers to reproduce the first spatialized audio signal.

15. The one or more non-transitory computer-readable media of claim 11, wherein the steps further comprise:
determining a position of a first window displaying at least a first video signal of the respective video signals;
spatializing, based on the position of the first window, a first audio signal associated with the first video signal to generate a first spatialized audio signal; and
driving a set of loudspeakers to reproduce the first spatialized audio signal.

16. The one or more non-transitory computer-readable media of claim 11, wherein the steps further comprise:
determining a position of an occupant within the vehicle associated with at least a first video signal of the respective video signals;
spatializing, based on the position of the occupant within the vehicle, a first audio signal associated with the first video signal to generate a first spatialized audio signal; and
driving a set of loudspeakers to reproduce the first spatialized audio signal.

17. The one or more non-transitory computer-readable media of claim 11, wherein the steps further comprise transmitting, by the media configuration manager, the remote media signal to the two or more consoles within the vehicle.

18. The one or more non-transitory computer-readable media of claim 11, wherein the communication link comprises a single bidirectional connection between the vehicle and the remote destination.

19. A system comprising:
a memory storing a media configuration manager application; and
a processor coupled to the memory that operates in a vehicle, executing the application by performing the steps of:
receiving a respective video signal from each of two or more consoles included in the vehicle, wherein each of the two or more consoles are included in a common communication session;
combining the respective video signals to generate a composite media signal;
transmitting, via a communication link, the composite media signal to a teleconference service operating at a remote destination;
receiving, via the communication link, a remote media signal from the teleconference service; and
causing respective video signals and the remote media signal to be reproduced at the two or more consoles.

* * * * *

UNITED STATES PATENT AND TRADEMARK OFFICE
CERTIFICATE OF CORRECTION

| | | |
|---|---|---|
| PATENT NO. | : 12,095,828 B2 | |
| APPLICATION NO. | : 17/565838 | |
| DATED | : September 17, 2024 | |
| INVENTOR(S) | : Riley Winton et al. | |

It is certified that error appears in the above-identified patent and that said Letters Patent is hereby corrected as shown below:

In the Claims

Column 34, Claim 11, Line 53, please delete "remote destination".

Signed and Sealed this
Twenty-ninth Day of October, 2024

*Katherine Kelly Vidal*

Katherine Kelly Vidal
*Director of the United States Patent and Trademark Office*